United States Patent
Morikawa et al.

(10) Patent No.: US 7,258,914 B2
(45) Date of Patent: Aug. 21, 2007

(54) POROUS MEMBRANE AND METHOD FOR MANUFACTURING THE SAME

(75) Inventors: Hirofumi Morikawa, Kusatsu (JP); Shin-ichi Minegishi, Otsu (JP); Shuji Furuno, Kyoto (JP); Toshyuki Ishizaki, Gamo-gun (JP); Masahiro Henmi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 411 days.

(21) Appl. No.: 10/448,122

(22) Filed: May 30, 2003

(65) Prior Publication Data

US 2003/0232184 A1 Dec. 18, 2003

(30) Foreign Application Priority Data

Jun. 14, 2002 (JP) .............................. 2002-173931
Feb. 21, 2003 (JP) .............................. 2003-043917

(51) Int. Cl.
*B32B 3/26* (2006.01)
*B01D 63/02* (2006.01)

(52) U.S. Cl. .............................. 428/316.6; 428/311.51; 428/313.3; 428/313.5; 428/315.7; 210/500.23; 210/500.27; 210/500.42; 210/650

(58) Field of Classification Search ............. 428/316.6, 428/315.7, 313.3; 210/500.23, 500.42, 500.27, 210/650
See application file for complete search history.

(56) References Cited

U.S. PATENT DOCUMENTS

| 4,539,256 | A | * | 9/1985 | Shipman ................... 428/315.5 |
| 5,022,990 | A | | 6/1991 | Doi et al. |
| 5,130,342 | A | * | 7/1992 | McAllister et al. ............ 521/61 |
| 5,395,570 | A | * | 3/1995 | Kopp et al. .................... 264/41 |
| 5,863,789 | A | * | 1/1999 | Komatsu et al. ............. 435/262 |
| 6,013,688 | A | | 1/2000 | Pacheco et al. |
| 2003/0094409 | A1 | * | 5/2003 | Minegishi et al. |
| 2004/0135274 | A1 | * | 7/2004 | Matsuda et al. |
| 2005/0258101 | A1 | * | 11/2005 | Minegishi et al. |

FOREIGN PATENT DOCUMENTS

| EP | 0 037 836 | 10/1981 |
| EP | 0 245 863 | 11/1987 |
| EP | 1 230 970 | 8/2002 |
| JP | 58-098105 | 6/1983 |
| JP | 63-243146 | 10/1988 |
| JP | 64-015102 | 1/1989 |
| JP | 03-296424 | 12/1991 |
| JP | 07-026076 | 1/1995 |
| JP | 09-025372 | 1/1997 |
| JP | 2002-121087 A | 4/2002 |
| JP | 2003-138422 | 5/2003 |
| WO | WO-01/28667 A1 | 4/2001 |

OTHER PUBLICATIONS

Hiatt et al. "Microporous Membranes via Upper Critical Temperature Phase Separation" Materials Science of Synthetic Membranes, 1985 American Chemical Society, pp. 229-244.
Lloyd "Microporous Membrane Formation via Thermally Induced Phase Separation. I. Solid—Liquid Phase Separation" Journal of Membrane Science, 52 (1990), pp. 239-261.

* cited by examiner

*Primary Examiner*—Hai Vo
(74) *Attorney, Agent, or Firm*—Morrison & Foerster LLP

(57) ABSTRACT

The object of the present invention is to provide a porous membrane having a high strength and excellent water permeability and rejection properties. The porous membrane of the present invention has both a three-dimensional network structure and a spherical structure. The porous membrane of the present invention is suitably used for water treatment membranes, battery separators, charged membranes, fuel cells, blood purification membranes, and the like.

12 Claims, 13 Drawing Sheets

POROUS MEMBRANE AND METHOD FOR MANUFACTURING THE SAME

BACKGROUND OF THE INVENTION

1. Field of the Invention

The present invention relates to micro filtration membranes and ultrafiltration membranes used for water treatment, such as drinking water production, water purification, and effluent treatment. The present invention also relates to porous membrane modules and to water separation apparatuses including such a porous membrane. Furthermore, the present invention relates to battery separators, charged membranes, fuel cells and blood purification membranes using a porous membrane.

2. Description of the Related Art

Porous membranes have been used in various fields including water treatment, such as water purification and effluent treatment; medical application, such as blood purification; food engineering; battery separators; charged membranes; and fuel cells.

In the field of producing drinking water, that is, in use for water treatment, such as water purification and effluent treatment, separation membranes are being substituted for conventional sand filtration and coagulation sedimentation, and are being used to improve the quality of treated water. A large amount of water is treated in these fields. Accordingly, a separation membrane having an excellent water permeability is advantageously used in view of membrane replacement costs and the footprints of apparatuses because an excellent water permeability can lead to a reduced area of the membrane, consequently reducing the size of the apparatuses and saving equipment expenses. The separation membranes are also required to have chemical resistance. In water purification, in order to sterilize permeate and prevent biofouling of membranes, an antiseptic, such as sodium hypochlorite, is added or the membranes are washed with an acid, an alkali, chlorine, a surfactant, or the like. Accordingly, separation membranes using a chemical-resistant material, such as a polyethylene resin, a polypropylene resin, or a polyvinylidene fluoride resin, have recently been developed and put into use. In the water purification field, accidents have surfaced since 1990s in which chlorine-resistant pathogens, such as cryptosporidium derived from livestock excrements or the like, are not completely disposed of in a filtration plant and, thus, contained in treated water. In order to prevent such an accident, separation membranes are required to have high physical strength and sufficient separation properties to prevent raw water from contaminating treated water.

In medical application, porous membranes are being used for blood purification, hemodialysis particularly serving as a substitution for kidney functions, blood filtration and blood filtration dialysis, and removal of waste products in blood by extracorporeal circulation. In food industry, porous membranes are used, in some cases, to separate and remove yeast used for fermentation and liquid condensation. In the field of batteries, porous membranes are being used for battery separators that allow electrolytes, but not cell reaction products, to permeate therethrough. Also, in the field of fuel cells, some porous membranes are used as the base material of macromolecular solid electrolytes. On the other hand, in the ultrapure water production, charged porous membranes are used to enhance ion exclusion characteristics and the purity of produced water, in some cases.

These porous membranes are required to have excellent separation characteristics, high chemical and physical strengths, and an excellent permeability, which shows how much untreated liquid permeates through the membranes.

European Patent Application No. 0037836 has disclosed a wet solution method for forming an asymmetrical porous structure by nonsolvent induced phase separation. In this method, a polymer solution prepared by dissolving a polyvinylidene fluoride resin in a good solvent is extruded from an extrusion head at a temperature much lower than the melting point of the polyvinylidene fluoride resin or is cast on a glass plate for forming. The product is brought into contact with a liquid containing a nonsolvent for polyvinylidene fluoride resins. In the wet solution method, unfortunately, it is difficult to perform uniform phase separation in the thickness direction and the resulting asymmetrical membrane has macro voids. Therefore, the mechanical strength of the membrane is unsatisfactory. Also, many factors of membrane forming conditions influence the structure and characteristics of resulting membranes. It is, therefore, difficult to control the step of forming membranes and reproducibility is poor. U.S. Pat. No. 5,022,990 has relatively recently disclosed a melt-extraction method for forming a porous structure. In this method, a polyvinylidene fluoride resin is melt-kneaded with inorganic particles and an organic liquid. The mixture is extruded from an extrusion head at a temperature higher than or equal to the melting point of the polyvinylidene fluoride resin or is pressed with a pressing machine, for forming. After cooling, the organic liquid and the inorganic particles are extracted. Thus, the porous structure is formed. This melt-extraction facilitates the control of void characteristics and helps prepare relatively uniform, strong membranes without forming macro voids. However, if the inorganic particles are not dispersed well, a defect, such as a pin hole, can occur. Also, the melt-extraction undesirably increases manufacturing costs extremely.

Other techniques for manufacturing a porous membrane have been disclosed in which polyolefin resins, such as polyethylene and polypropylene, are used as raw materials. For example, a polyolefin film containing an inorganic filler is drawn in at least one direction so that interface separation occurs between the inorganic filler and the polyolefin to form voids in the film (for example, Japanese Unexamined Patent Application Publication Nos. 7-26076 and 9-25372). In this technique, however, since the inorganic filler must be extracted to be removed, manufacturing costs increase undesirably. Furthermore, in this technique, it is difficult to control the pore size in membrane surfaces and, therefore, only membranes having a relatively large pore size of 0.1 to 1.0 μm are manufactured.

European Patent Application No. 0245863 illustrates a composite membrane including an ultrafiltration membrane disposed on a porous membrane. In the preparation of this composite membrane, the porous membrane, acting as the base material, is treated with an alcohol solution of glycerin to enhance the affinity for the ultrafiltration membrane. After drying, a polymer solution is applied to the base material and is solidified to form the ultrafiltration membrane. This technique therefore makes manufacturing processes complicated and extremely increases manufacturing costs.

SUMMARY OF THE INVENTION

The object of the present invention is to provide a porous membrane having a high strength and excellent water permeability and rejection properties.

The present invention is directed to a porous membrane having both a three-dimensional network structure and a spherical structure.

The present invention is also directed to a water separation apparatus including a porous membrane module using the above-described porous membrane and compression means at the raw water side of the porous membrane module or suction means at the permeate side.

The present invention is also directed to a method for producing permeate from raw water using the water separation apparatus.

The present invention is also directed to a battery separator, a charged membrane, a fuel cell, and a blood purification membrane using the porous membrane.

The present invention is also directed to a method for manufacturing a porous membrane having both a three-dimensional network structure and a spherical structure. In the method, a thermoplastic resin is dissolved in a solvent. The resulting resin solution is discharged from an extrusion head into a cooling liquid to be solidified. In this instance, different compositions of the cooling liquid are respectively uses for one surface side of the porous membrane and the other surface side.

The present invention is also directed to a method for manufacturing a porous membrane having both a three-dimensional network structure and a spherical structure. In this method, the three-dimensional network structure is formed on at least one surface of a porous membrane having the spherical structure.

The present invention is also directed to a method for manufacturing a porous membrane having both a three-dimensional network structure and a spherical structure. In this method, a resin solution for forming the three-dimensional network structure and a resin solution for forming the spherical structure are simultaneously discharging from an extrusion head, and are subsequently solidified.

DESCRIPTION OF THE PREFERRED EMBODIMENTS

Figure 1:
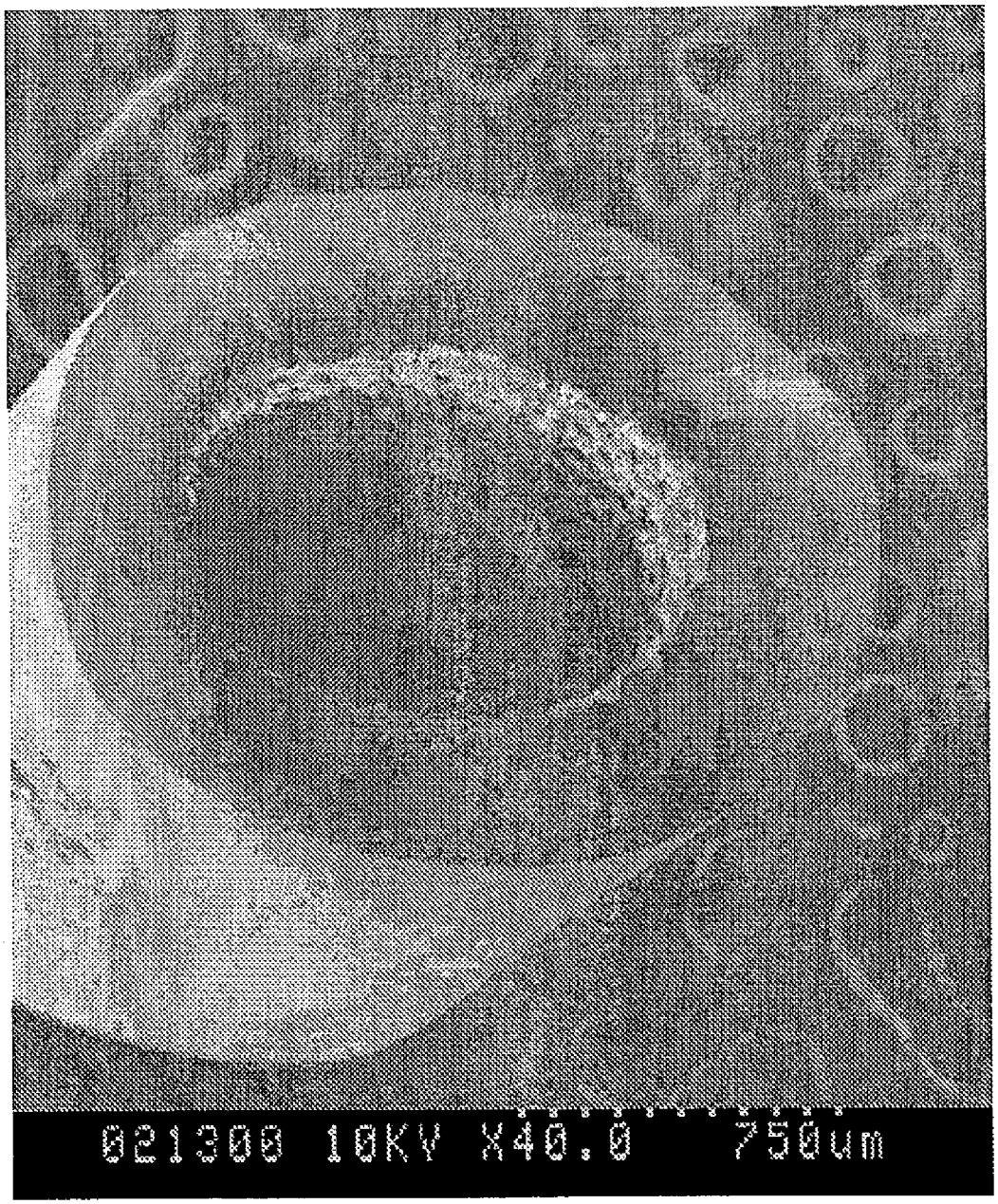
FIG. 1 is a cross-sectional photograph of a hollow fiber membrane manufactured by a method in Example 1 according to the present invention.

A porous membrane of the present invention is characterized in that it has both a three-dimensional network structure and a spherical structure. The three-dimensional network structure here refers to a structure in which solid contents spread in three dimensions. The three-dimensional network structure has pores separated by solid contents forming a net.

The spherical structure here refers to a structure in which many spherical or substantially spherical solid contents are combined to each other directly or through streak solid contents. Supposedly, the spherical structure substantially consists of spherulites. A spherulite is thermoplastic resin crystals precipitated and solidified when a thermoplastic resin solution is phase-separated to form a porous structure.

The mean pore size of the three-dimensional network structure is preferably in the range of 5 nm to 50 μm, and more preferably in the range of 10 nm to 30 μm. The mean pore size of the three-dimensional network structure refers to the mean diameter of the pores in the three-dimensional network structure. In order to determine the mean pore size, the cross section of the porous membrane is photographed through a scanning electron microscope (SEM) or the like at a magnification allowing the pores to be clearly observed, and the diameters of arbitrary 10 or more pores, preferably arbitrary 20 or more pores, are measured and number-averaged. Also, the mean pore size may be determined using an image processing system in which the mean diameter of the pores is measured. In this instance, the mean diameter of equivalent rounds is defined as the mean pore size. The mean diameter of equivalent rounds is determined by the expression $(a \times b)^{0.5}$, wherein a and b are the breadth and the length of elliptical pores, respectively.

The mean diameter of the spherical structure is preferably in the range of 0.1 μm to 10 μm, and more preferably in the range of 0.2 μm to 5 μm. In order to determine the diameter of the spherical structure, the surface or cross section of the porous membrane is photographed through a scanning electron microscope or the like at a magnification allowing the spherulites to be clearly observed. The diameters of arbitrary 10 or more spherical structures, preferably arbitrary 20 or more spherical structures, are measured and number-averaged. The mean diameter may be defined as the mean diameter of equivalent rounds obtained by analyzing the photograph with image processing system.

A membrane having the spherical structure results in a strong membrane with the permeability maintained. However, it is not easy to enhance the rejection properties. By giving the porous membrane of the present invention both a three-dimensional network structure and a spherical structure together, the resulting porous membrane exhibited a high strength, a high permeability, and high rejection properties. In particular, by setting the mean pore size of the three-dimensional network structure in the range of 5 nm to 50 μm and the mean diameter of the spherical structure in the range of 0.1 to 10 μm, the strength, the permeability, and the rejection properties are advantageously brought into balance at a high level. A three-dimensional network structure including macro voids particularly with a mean pore size of more than 50 μm can lead to a membrane having an excellent permeability. However, the strength of the resulting membrane becomes low.

The three-dimensional network structure and the spherical structure may coexist in any form. Preferably, in order to bring into balance the strength, the permeability, and the rejection properties at a high level, the three-dimensional network structure and the spherical structure are layered on each other. Particularly preferably, the three-dimensional network structure is disposed on one surface side of the membrane and the spherical structure is disposed on the other side.

Preferably, the porous membrane of the present invention has a water permeability in the range of 0.1 to 10 $m^3/m^2 \cdot h$ at 50 kPa and 25° C. and a rejection of 90% or more for particles with a particle size of 0.843 μm. Preferably, it also exhibits a fracture strength of 2 MPa or more and a fracture elongation of 15% or more. The water permeability is more preferably in the range of 0.15 to 7 $m^3/m^2 \cdot h$. The rejection is more preferably at least 95% for particles with a particle size of 0.843 μm. The fracture strength is, more preferably, at least 3 MPa. The fracture elongation is, more preferably, at least 20%. If these requirements are satisfied, a porous membrane can be achieved which has sufficient strength, permeability, and rejection property to be used in water treatment, battery separators, charged membranes, fuel cells, blood purification, and the like.

The porous membrane of the present invention may suitably be used in a hollow fiber form or a flat form.

The measurements of water permeability and rejection properties were performed on a miniature module of 200 mm in length including four hollow fiber membranes. Reverse osmosis membrane treated water was entirely filtered for 30 minutes by external pressure at a temperature of 25° C. and a differential pressure of 16 kPa. Thus, a quantity of permeate ($m^3$) is measured. The quantity of permeate ($m^3$) is converted into a value per hour (h) and a value per effective membrane area ($m^2$). These values were further multiplied by 50/16 and converted into a value at a pressure of 50 kPa. Thus, the water permeability was determined. Water in which polystyrene latex particles having a mean particle size of 0.843 μm were dispersed was entirely filtered for 30 minutes by external pressure at a temperature of 25° C. and a differential pressure of 16 kPa. The rejection properties can be determined from the ratio of the latex particle concentration in raw water to that in permeate. These latex particle concentrations are obtained by measuring absorption coefficients of ultraviolet light having a wavelength of 240 nm. The measurements on a flat membrane are performed in the same manner as in the measurement on the hollow fiber membrane, except that the membrane is cut to a circle of 50 mm in diameter and the circle membrane is placed on a cylindrical filtration holder. The water permeability may be derived from a value obtained under pressure or aspiration. Water temperature may be estimated from the viscosity of liquid to be evaluated. A water permeability as low as less than 0.1 $m^3/m^2 \cdot h$ is not suitable for the porous membrane because such a water permeability is excessively low. In contrast, if the water permeability is as high as more than 10 $m^3/m^2 \cdot h$, the porous membrane has such an excessively large pore size that the impurity rejection properties are negatively affected. Also, when the rejection is less than 90% for particles with a particle size of 0.843 μm, the porous membrane undesirably has an excessively large pore size and degraded impurity rejection properties.

The fracture strength and the fracture elongation can be measured without particular limitation. For example, a tensile test is performed with a tensile tester at a tensile speed of 50 mm/min on more than five samples having a measurement length of 50 mm. Obtained fracture strengths and fracture elongations are averaged. If the fracture strength is less than 2 MPa or the fracture elongation is less than 15%, the porous membrane is difficult to handle and is liable to be fractured by filtration or pressure.

The preferred mean pore size in the surface of the porous membrane depends on use. However, in the present invention, it is preferable that at least one surface of the porous membrane have a mean pore size of 0.5 μm or less, and more preferably 0.2 μm or less. The lower limit of the mean pore size in the surface also depends on use, but it is generally preferable to be 0.001 μm (1 nm) or more. Preferably, the pore size distribution is narrow. In particular, in a separation membrane for water treatment, the mean pore size of the porous membrane surface is preferably in the range of 0.005 to 0.5 μm, and more preferably in the range of 0.007 to 0.2 μm. A mean pore size in these ranges leads to both high rejection properties and a high water permeability. Also, when the mean pore size is in these ranges, the pores are not easily clogged with water contaminants and, therefore, the water permeability is not negatively affected. The porous membrane can, therefore, be used successively for a long time. If clogging occurs, contaminants can easily be removed by backwash or air cleaning. The contaminants are different from one water source to another. For example, in the case of a river or a lake, the contaminants include inorganic substances derived from soil and mud and their colloids, microorganisms and their corpses, and humic substances derived from plants and microorganisms. The backwash is performed by delivering permeate in a direction reverse to a normal filtration. The air cleaning is performed on a hollow fiber membrane by delivering air to vibrate the hollow fiber membrane so that the contaminants deposited on the surface of the membrane are removed.

Either surface of the membrane may be set to a mean pore size of 0.5 μm or less. In separation membranes for water treatment, it is preferable that the external surface side, which comes in contact with water, have a three-dimensional network structure whose mean pore size is 0.5 μm or less in the external surface, and that the internal surface side have a spherical structure, from the viewpoint of the enhancement of strength, water permeability, rejection properties, and contamination resistance.

In order to determine the mean pore size in the surface, the surface of the porous membrane is photographed through a SEM or the like at a magnification allowing the pores to be clearly observed. The diameters of arbitrary 10 or more pores, preferably arbitrary 20 or more pores, are measured and number-averaged. Also, the mean pore size may be determined using an image processing system in which the mean diameters of the pores are obtained. In this instance, the mean diameter of equivalent rounds is defined as the mean pore size. The mean diameter of equivalent rounds is determined by the expression $(a \times b)^{0.5}$, wherein a and b are the breadth and the length of elliptical pores, respectively.

The resin used in the present invention is not particularly limited, but, preferably, a thermoplastic resin is used because it is easy to form a spherical structure. The thermoplastic resin is constituted of a chain macromolecular compound, and is deformed or fluidized by an external force when heated. Exemplary thermoplastic resins include polyethylene, polypropylene, acrylic resins, polyacrylonitrile, acrylonitrile-butadiene-styrene (ABS) resins, polystyrene, acrylonitrile-styrene (AS) resins, vinyl chloride resins, polyethylene terephthalate, polyamide, polyacetal, polycarbonate, modified polyphenylene ether, polyphenylene sulfide, polyvinylidene fluoride, polyamideimide, polyetherimide, polysulfone, polyether sulfone, and their mixtures and copolymers. These resins may be mixed with another resin capable of being blended.

Particularly preferably, a resin selected from the group consisting of polyethylene resins, polypropylene resins, and polyvinylidene fluoride resins is used as the thermoplastic resin in the present invention because they have high chemical resistance.

The polyethylene resins used in the present invention contain a polyethylene homopolymer and/or a polyethylene copolymer. A plurality of types of polyethylene copolymer may be contained. An exemplary polyethylene copolymer may comprise ethylene and at least one straight-chain unsaturated hydrocarbon selected from propylene, butene, pentene, and the like.

The polypropylene resins used in the present invention contain a polypropylene homopolymer and/or a polypropylene copolymer. A plurality of types of polypropylene copolymer may be contained. An exemplary polyethylene copolymer may comprise propylene and at least one straight-chain unsaturated hydrocarbon selected from ethylene, butene, pentene, and the like.

The polyvinylidene fluoride resins used in the present invention contain a vinylidene fluoride homopolymer and/or a vinylidene fluoride copolymer. A plurality of types of vinylidene fluoride copolymer may be contained. An exemplary vinylidene fluoride copolymer may comprise a vinylidene fluoride and at least one selected from the group consisting of vinyl fluoride, ethylene tetrafluoride, propylene hexafluoride, chlorotrifluoroethylene. The weight-average molecular weight of the polyvinylidene fluoride resin is appropriately selected according to the strength and water permeability of the porous membrane required. Preferably, it is in the range of fifty thousand to one million. If the workability of the porous membrane is taken into account, the weight-average molecular weight is preferably in the range of 100 thousand to 700 thousand, and more preferably in the range of 150 thousand to 600 thousand.

The polyethylene, polypropylene, and polyvinylidene fluoride resins may contain 50 percent by weight or less of another resin capable of being blended. For example, the polyvinylidene fluoride resin preferably contains 50 percent by weight or less of an acrylic resin. The acrylic resin refers to a macromolecular compound mainly containing a polymer of acrylic acid, a methacrylic acid, or their derivative, such as acrylamide or acrylonitrile. Particularly preferably, acrylic ester resins and methacrylic ester resins are used because they are miscible with polyvinylidene fluoride resins. By preparing a polymer blend containing such a plurality of resins, the strength, water permeability, rejection properties, and other properties can be controlled.

The three-dimensional network structure and the spherical structure may be formed of an identical type of resin or different types of resin. When the three-dimensional network structure and the spherical structure are formed of an identical type of resin, both structures advantageously have an affinity for each other. On the other hand, when each structure is formed of a different type of resin, the strength, water permeability, rejection properties, and other properties can be set in a wider range. The spherical structure is preferably formed of a thermoplastic resin, as described above. However, the three-dimensional network structure may be formed of a resins selected from among various types of resin with a wide range of choice. Either the three-dimensional network structure or the spherical structure or both may advantageously be formed of a polymer blend containing the same resin as in each other. By using such a polymer blend, the strength, water permeability, rejection properties, and other properties can be controlled in a wide range with a high affinity maintained between both structures.

The above-described porous membrane is used as a porous membrane module which is housed in a case having a raw water inlet, a permeate outlet, and the like. In the case where the porous membrane is in a hollow fiber form, the porous membrane module is fabricated so as to recover permeate, by housing a bundle of plurality of hollow fiber membranes in a cylindrical container with both ends or one end fixed with a polyurethane or epoxy resin, or by fixing both ends of the hollow fiber membranes in a plate form. In the case where the porous membrane is in a flat form, the porous membrane module is fabricated so as to recover permeate, by folding the porous membrane in a cylindrical manner, around a liquid collection pipe and taking up the membrane in a spiral manner to be housed in a cylindrical container, or by disposing the membrane on both surfaces of a liquid collection board with the periphery fixed water tightly.

The porous membrane module is provided with at least compression means at the raw water side or suction means at the permeate side to be used as a liquid separation system. As the compression means, a pump may be used, or pressure caused by the difference of water levels may be used. A pump or a siphon may be used as the suction means.

This liquid separation system can be used for water purification, clean water treatment, effluent treatment, industrial water production, and the like in the field of water treatment. Thus, river water, lake water, groundwater, seawater, sewage, discharged water, and the like are treated.

The above-described porous membrane can also be used for a battery separator for separating the positive electrode and the negative electrode in a battery. In this instance, it is expected to enhance battery performance because of a high ion permeability and to enhance the durability of the battery because of a high fracture strength.

Furthermore, the porous membrane prepared by the above-described manufacturing method is used as a charged membrane by introducing charged groups (ion exchange groups). The charged membrane is expected to achieve the effects of improving ion recognition properties and enhancing the durability because of a high fracture strength.

Also, the porous membrane is used as an ion exchange membrane for a fuel cell by impregnating the porous membrane with an ion exchange resin. In particular, when methanol is used as a fuel, the swelling of the ion exchange membrane with methanol is suppressed and the methanol is prevented from leaking from the anode to the cathode through the ion exchange membrane, that is, so-called crossover is prevented. Thus, it is expected that the performance of the fuel cell is enhanced. Furthermore, it is expected to enhance the durability of the fuel cell because of a high fracture strength.

The above-described porous membrane is also used as a blood purification membrane. This blood purification membrane is expected to increase the properties of removing waste products in blood, and to enhance the durability of the blood purification membrane because of a high fracture strength.

The porous membrane having both a three-dimensional network structure and a spherical structure can be manufactured by various techniques. For example, both the three-dimensional network structure and the spherical structure may be simultaneously formed of an identical resin solution. The three-dimensional network structure may be layered on at least one surface of a porous membrane having the spherical structure. Alternatively, at least two types of resin solutions may be discharged from an extrusion head at one time to form the three-dimensional network structure and the spherical structure simultaneously.

A method for simultaneously forming a three-dimensional network structure and a spherical structure of an identical resin solution will be described below. In this method, for example, a thermoplastic resin is dissolved in a poor or good solvent for the resin to be a relatively high concentration in the range of about 20 to 60 percent by weight. This thermoplastic resin solution is cooled to solidify. Thus, a three-dimensional network structure and a spherical structure are simultaneously formed. The poor solvent refers to a solvent incapable of dissolving 5 percent by weight or more of resin at a low temperature of 60° C. or less, but capable of dissolving 5 percent by weight or more of rein at a high temperature between 60° C. and the melting point of the resin (for example, about 178° C. when the resin comprises a vinylidene fluoride homopolymer). On the other hand, a solvent capable of dissolving 5 percent by weight or more of resin at a temperature as low as 60° C. or less is defined as a good solvent. A solvent not allowing a resin to dissolve or swell is defined as a nonsolvent. When a polyvinylidene fluoride resin is used, exemplary poor solvents include alkyl ketones, esters, glycol esters and organic carbonates having a medium chain length; such as cyclohexanone, isophorone, γ-butyrolactone, methyl isoamyl ketone, dimethyl phthalate, propylene glycol methyl ether, propylene carbonate, diacetone alcohol, and glycerol triacetate; and their mixtures. A mixture of a nonsolvent and a poor solvent, satisfying the above-described definition, is defined as a poor solvent. Exemplary good solvents include lower alkyl ketones, such as N-methyl-2-pyrrolidone, dimethyl sulfoxide, dimethylacetamide, dimethylformamide, methyl ethyl ketone, acetone, tetrahydrofuran, tetramethylurea, and trimethyl phosphate; esters; amides; and their mixtures. Exemplary nonsolvents include water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, aliphatic hydrocarbons such as low-molecular-weight polyethylene glycols, aromatic hydrocarbons, aliphatic polyhydric alcohols, aromatic polyhydric alcohols, chlorinated hydrocarbons, other chlorinated organic liquids, and their mixtures.

In the above-described method, preferably, a thermoplastic resin is dissolved in a poor or good solvent for the resin at a relatively high temperature in the range of 80 to 170° C. to prepare a thermoplastic resin solution having a relatively high concentration in the range of 20 to 60 percent by weight. As the resin concentration increases, the resulting porous membrane exhibits higher stretch properties. However, an excessively high concentration reduces the void ratio and the water permeability is negatively affected. Unless the viscosity of the prepared resin solution is set in a proper range, the resulting membrane does not become porous. More preferably, the resin concentration is in the range of 30 to 50 percent by weight.

The solidification of the resin solution is, preferably, performed by cooling solidification in which the resin solution is discharged into a cool bath from an extrusion head. In this instance, preferably, a liquid with a temperature in the range of 5 to 50° C., containing 60 to 100 percent of a poor or good solvent is used as a cooling liquid in the cool bath. The cooling liquid may contain a nonsolvent in addition to the poor or good solvent. By dissolving a relatively high concentration of a thermoplastic resin in a poor or good solvent for the resin at a relatively high temperature and rapidly cooling it to solidify, the resulting membrane can have a fine spherical structure or a dense network structure without macro voids. In particular, the membrane having the spherical structure exhibits a high strength and a high water permeability. Whether the membrane has a spherical structure or a network structure is set by selecting a combination of the concentration of the resin solution, the composition of the solvent for dissolving the resin, and the temperature of the cooling liquid in the cool bath. On the other hand, in the known wet solution method, since the concentration of the resin solution is set in the range of 10 to 20 percent by weight so as to achieve a water permeability, the resulting membrane has a network structure with macro voids and does not exhibit a high stretch.

In order to obtain the porous membrane of the present invention, the combination of the composition of the solvent for dissolving the resin and the composition of the cooling liquid in the cool bath is important, as well as the concentration of the resin solution. In particular, in order to provide both a three-dimensional network structure and a spherical structure, it is preferable that the resin solution applied on one surface of the membrane be solidified using a cooling liquid having a different composition from the composition for the other surface. Specifically, the combinations of the composition of the resin solution and the composition of the cooling liquid are adjusted so as to form a three-dimensional network structure on one surface and form a spherical structure on the other surface.

If the porous membrane is formed in a hollow fiber, after a resin solution is prepared, the resin solution and a lumen forming fluid are respectively discharged from the external pipe and the internal pipe of a double co-extrusion head for spinning hollow fiber membranes, while being solidified in a cool bath. Thus, a hollow fiber membrane is formed. In this instance, a gas or a liquid may be used as the lumen forming fluid. However, in the present invention, the same liquid as the cooling liquid is preferably used, which contains 60 to 100 percent of a poor solvent or good solvent. In this instance, by varying the compositions of the lumen forming fluid and the cooling liquid in the cool bath, a hollow fiber membrane having both the three-dimensional network structure and the spherical structure can be provided. The lumen forming fluid may be supplied with cooling. However, if the cool bath has sufficient power to solidify the hollow fiber membrane, the lumen forming fluid may be supplied without cooling.

If the porous membrane is formed in a flat membrane, after a resin solution is prepared, the resin solution is discharged from a slit extrusion head and solidified in a cool bath. In this instance, by adjusting the compositions of cooling liquids coming into contact with one surface of the flat membrane and with the other surface, or by bringing the cool bath into contact with only one surface of the flat membrane, the resulting flat membrane can have both a three-dimensional network structure and a spherical structure. The method for varying the cooling liquid compositions coming into contact with one surface of the flat membrane and with the other surface is not particularly limited. However, for example, a cooling liquid is sprayed from one side of the flat membrane and another cooling liquid is sprayed from the other side. The method for bringing only one side of the flat membrane into contact with a cool bath is not particularly limited. However, for example, the flat membrane may be floated on the surface of the cool bath, or a cooling liquid may be sprayed from only one side of the flat membrane.

Also, it is a preferred form of embodiments of the invention that a porous substrate may further be bonded so as to support the porous membrane to give a strength to the membrane, because the fracture strength is enhanced. The material of the porous substrate is not particularly limited, and organic materials and inorganic materials may be used. However, organic materials are preferable from the viewpoint of weight saving. More preferably, a woven or non-woven textile comprising a organic fiber, such as a cellulose fiber, a cellulose triacetate fiber, a polyester fiber, a polypropylene fiber, and a polyethylene fiber, may be used.

The manufacturing method up to this point can provide a water-permeable porous membrane having high stretch properties. However, if the water permeability is not satisfactory, the porous membrane may further be drawn at a draw ratio in the range of 1.1 to 5.0. This is a preferred form of embodiments of the invention because the water permeability of the porous membrane is enhanced.

Another method for forming a porous membrane having a three-dimensional network structure and a spherical structure will now be described. In this method, a layer having a three-dimensional network structure is formed afterward on at least one surface of a porous membrane having a spherical structure.

In this method, first, a porous membrane having a spherical structure is formed. The method for forming the porous membrane having the spherical structure is not particularly limited, but, preferably, the foregoing method may be applied.

A layer having a three-dimensional network structure is formed on at lest one surface of the resulting porous membrane having the spherical structure. The method for this is not particularly limited, but, preferably, the following method is applied. Specifically, after a resin solution is applied onto at least one surface of the porous membrane having the spherical structure, the membrane is immersed in a solidification liquid. Thus, a layer having a three-dimensional network structure is formed.

Exemplary resins used here include acrylic resins, polyacrylonitrile resins, acrylonitrile-butadiene-styrene (ABS) resins, polystyrene resins, acrylonitrile-styrene (AC) resins, vinyl chloride resins, polyethylene terephthalate resins, polyamide resins, polyacetal resins, polycarbonate resins, modified -polyphenylene ether resins, polyphenylene sulfide resins, polyvinylidene fluoride resins, polyamideimide resins, polyetherimide resins, polysulfone resins, polyether sulfone resins, and their mixtures and copolymers. These resins may contain another resin capable of being blended, a polyhydric alcohol, or a surfactant in an amount of 50 percent by weight or less.

Particularly preferably, a resin selected from the group consisting of polysulfone resins, polyether sulfone resins, acrylic resins, polyacrylonitrile resins and polyvinylidene fluoride resins is used because they are chemical resistant.

A good solvent for the resin is preferably used as a solvent for dissolving the resin. As the good solvent, the foregoing substances may be used. The concentration of the resin is generally preferably in the range of 5 to 30 percent by weight, and more preferably in the range of 10 to 25 percent by weight. If the resin concentration is less than 5 percent by weight, the physical durability of the layer having the three-dimensional network structure is negatively affected. If the resin concentration is more than 30 percent by weight, a high pressure is required when a liquid is allowed to permeate.

The method for applying the resin solution onto at least one surface of the porous membrane having the spherical structure is not particularly limited. However, preferably, the porous membrane is immersed in the solution, or the solution is applied onto at least one surface of the porous membrane. If the porous membrane is formed in a hollow fiber, in order to apply the solution onto the external surface of the hollow fiber membrane, the hollow fiber membrane may be immersed in the solution or the solution may be dripped onto the hollow fiber membrane. Also, in order to apply the solution onto the internal surface of the hollow fiber membrane, preferably, the solution is injected into the hollow fiber membrane. In order to control the amount of the solution applied, after the porous membrane is immersed in the solution or the solution is applied onto the porous membrane, part of the applied solution may be scraped off or blown off with an air knife, in addition to the method of controlling the solution amount itself.

Preferably, a solidification liquid contains a nonsolvent for the resin. As the nonsolvent, the foregoing substances may be used. By bring the resin solution into contact with the nonsolvent, nonsolvent induced phase separation occurs to form a layer having a three-dimensional network structure.

The method for setting the mean pore size in the surface in the foregoing range depends on the type of resin, but, for example, the following method may be applied. An additive is added to the resin solution. The additive is eluted when or after the three-dimensional network structure is formed. Thus, the mean pore size in the surface is controlled. Organic compounds or inorganic compounds may be used as the additive. Preferably, the organic compounds are capable of dissolving in both the solvent for the resin and the nonsolvent causing nonsolvent induced phase separation. Exemplary organic compounds include water-soluble polymer, such as polyvinylpyrrolidone, polyethylene glycol, polyvinyl alcohol, polyethyleneimine, polyacrylic acid, and dextran; surfactants; glycerine; and saccharides. Preferably, the inorganic compounds are soluble in water. Exemplary inorganic compounds include calcium chloride, lithium chloride, and barium sulfate. Alternatively, the mean pore size in the surface is controlled by selecting the type, concentration, and temperature of the nonsolvent in the solidification liquid so as to adjust the phase separation speed, instead of using the additive. In general, a high phase separation speed leads to a small mean pore size in the surface, and a low phase separation speed leads to a large mean pore size. Also, it is advantageous to add a nonsolvent to the resin solution for controlling the phase separation speed.

Still another method for forming a porous membrane having both a three-dimensional network structure and a spherical structure will now be described. In this method, two or more types of resin solution are simultaneously discharged from an extrusion head to form a three-dimensional network structure and a spherical structure at one time. In this method, the three-dimensional network structure and the spherical structure are formed, for example, by discharging a resin solution for forming the three-dimensional network structure and a resin solution for forming the spherical structure and subsequently solidifying the solutions. Since this method allows simultaneous formation of the three-dimensional network structure and the spherical structure, manufacturing processes are advantageously simplified. The resin solution for forming the three-dimensional network structure is not particularly limited as long as it is solidified to result in a three-dimensional network structure. For example, a solution may be used which is prepared by dissolving a resin in a solvent and in which nonsolvent induced phase separation is caused by coming into contact with a solidification bath. The resin solution for forming the spherical structure is not particularly limited as long as it is solidified to result in a spherical structure. For example, a solution may be used which is prepared by dissolving a thermoplastic resin, such as a polyvinylidene fluoride resin, in a relatively high concentration of about 20 to 60 percent by weight, in a poor or good solvent for the resin at a relatively high temperature (about 80 to 170° C. ). As the thermoplastic resin, solidification bath, and poor or good solvent, preferably, the foregoing substances are used.

The extrusion head for simultaneously discharging the resins solution for forming the three-dimensional network structure and the spherical structure is not particularly limited. However, if the porous membrane is formed in a flat membrane, a double-slit head having two slits is preferably used. If the porous membrane is formed in a hollow fiber membrane, a triple co-extrusion head is preferably used. The resins for forming the three-dimensional network structure and the spherical structure are discharged from the external pipe and the middle pipe of the triple-co-extrusion head and a lumen forming fluid is discharged from the internal pipe, while they are solidified in a cool bath. Thus, a hollow fiber membrane is formed. According to this method, for manufacturing a hollow fiber membrane, the amount of lumen forming fluid can advantageously be set to be smaller than that of the cooling liquid used for forming a flat membrane. By discharging the resin for forming a three-dimensional network structure and the resin for forming a spherical structure from the external pipe and the middle pipe, respectively, a hollow fiber membrane can be obtained which has a three-dimensional network structure on the external side and a spherical structure on the internal side. In contrast, by discharging the resin for forming the three-dimensional network structure and the resin for forming the spherical structure from the middle pipe and the external pipe, respectively, a hollow fiber membrane can be obtained which has the three-dimensional network structure on the internal side and the spherical structure on the external side.

The above-described porous membrane is used as a porous membrane module which is housed in a case having a raw water inlet, a permeate outlet, and the like. A porous membrane formed in a hollow fiber membrane is uses as a hollow fiber membrane module.

Figure 9:
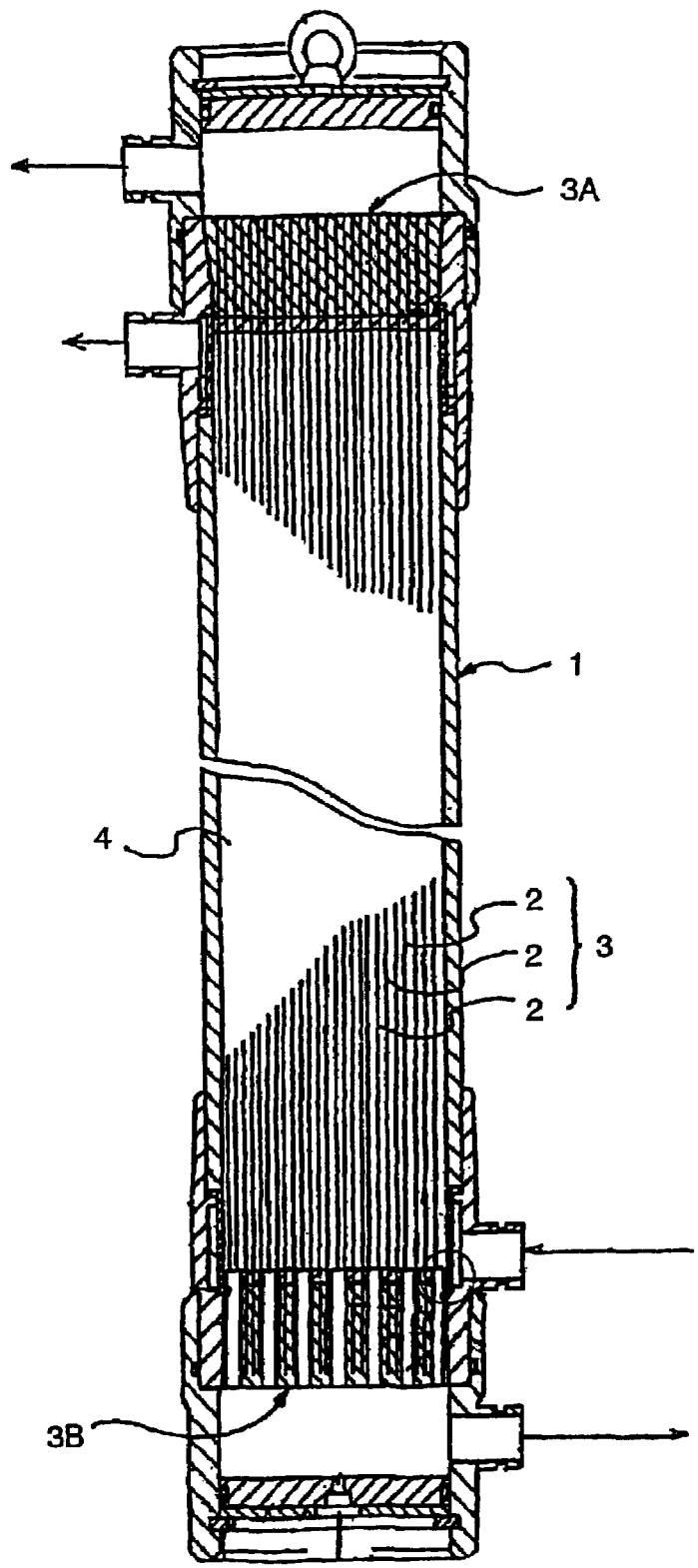
FIG. 9 shows an example of a hollow fiber membrane module.

FIG. 9 shows an example of the hollow fiber membrane module. Several hundreds to tens of thousands of hollow fiber membranes 2 are tied in a bundle to prepare a hollow fiber bundle 3. The hollow fiber bundle 3 is housed in a cylindrical case 1. Both ends of the cylindrical case 1 are sealed with sealants 3A and 3B secured to the internal walls of the cylindrical case 1. A filtration chamber 4 is provided in the space between the sealants 3A and 3B in the cylindrical case. The hollow fiber bundle 3 is placed in the filtration chamber 4.

The hollow fiber bundle 3 may be disposed in a U shape in the cylindrical case 1. However, in the present invention, it is disposed in line with being fixed by the sealants and each lumen of the hollow fiber membranes 2 is open to the external surface of one or both of the sealants.

The sealants 3A and 3B are formed by injecting a fluid resin into the interstices between the hollow fiber membranes constituting the hollow fiber bundle and, subsequently, solidifying the resin. The solidified resin, constituting the sealants 3A and 3B, is integrated with the hollow fiber membranes 3 and further integrated with the internal walls of the cylindrical case 1 (such a sealing manner with a resin is referred to as potting).

When potting is performed, the portions corresponding to the ends of the openings of the completed hollow fiber membranes 2, acting as a final product, are filled with a resin or crashed to close the openings in advance so that the potting resin is prevented from permeating. After potting, part of the sealants formed by potting is cut away such that the previously filled portions of the lumens are removed.

In this drawing, raw water is supplied to the filtration chamber under pressure. The raw water reaches the lumens of the hollow fiber membranes through the hollow fiber membranes in the filtration chamber. During this flow, the raw water is filtrated to be permeate. The permeate is discharged from the openings of the hollow fiber membranes.

Figure 10:
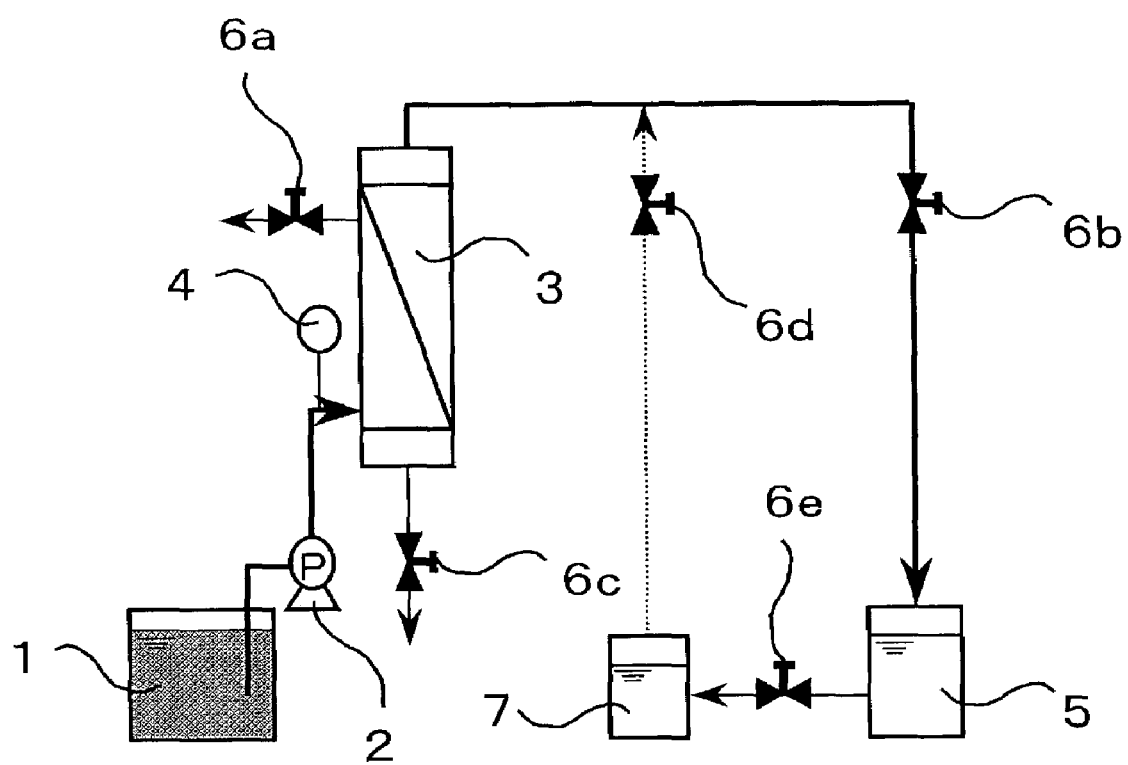
FIG. 10 shows an example of a water separation apparatus using a hollow fiber membrane module.

The hollow fiber membrane module formed as in above is provided with at least compression means at the raw water side or suction means at the permeate side. FIG. 10 shows an example of a water separation apparatus using a hollow fiber membrane module. The raw water stored in a raw water tank 1 is pressurized with a booster pump 2 and is subsequently supplied to the membrane module 3. The pressure of the supplied raw water is measured with a pressure gauge 4, if necessary. The raw water is separated into permeate and concentrated water through the membrane module 3. In the apparatus in the drawing, the concentrated water is drained outside and the permeate is stored in a treated water tank 5. In the apparatus in the drawing, a backwash water tank 7 is provided. By delivering water in a direction reverse to a normal direction, the membrane module 3 is cleaned. This water flow is controlled by valves 6a to 6d. As the compression means, pressure caused by the difference of water levels may be used instead of the pump. A pump or a siphon may be used as the suction means.

On the other hand, a flat porous membrane is used as a spiral element or a plate-and-frame element. These elements are also provided with at least compression means at the raw water side or suction means at the permeate side. As the compression means, a pump may be used, or pressure caused by the difference of water levels may be used. A pump or a siphon may be used as the suction means.

Figure 11:
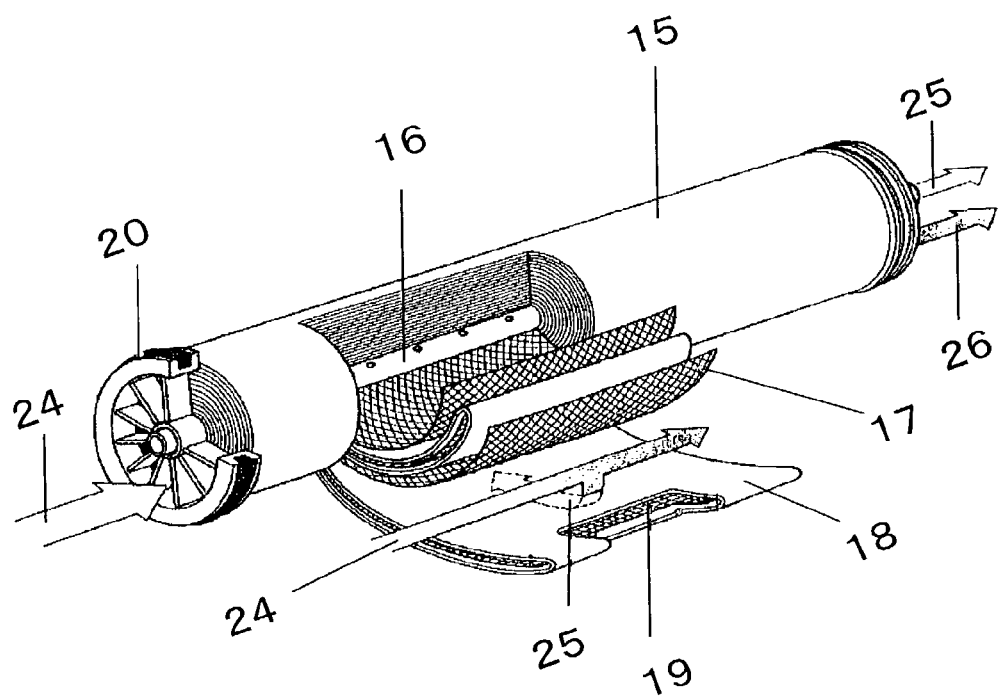
FIG. 11 shows an example of a spiral element.

FIG. 11 shows an example of a spiral element. In a spiral element 15, a porous membrane 18 formed in a bag-like manner with a feed water spacer 17 wrapped therein is wound on a center pipe 16 in a spiral manner with a permeate spacer 19 in gaps between turns of the membrane. A brine seal 20 is provided at one end of the spiral element. The spiral element 15 guides water supplied, under a prescribed pressure, from the brine seal 20 side to the porous membrane 18 through the permeate spacer 19. Permeate which has passed through the porous membrane 18 is taken out through the center pipe 16.

Such an element having this structure can have a membrane area larger than that of a plate-and-frame element, described later, and, accordingly the amount of permeate can advantageously be set large. However, the spiral element is rather vulnerable to contamination. It is, therefore, suitable for clean raw water (such as clean sea water, brine water, and river water).

Figure 12:
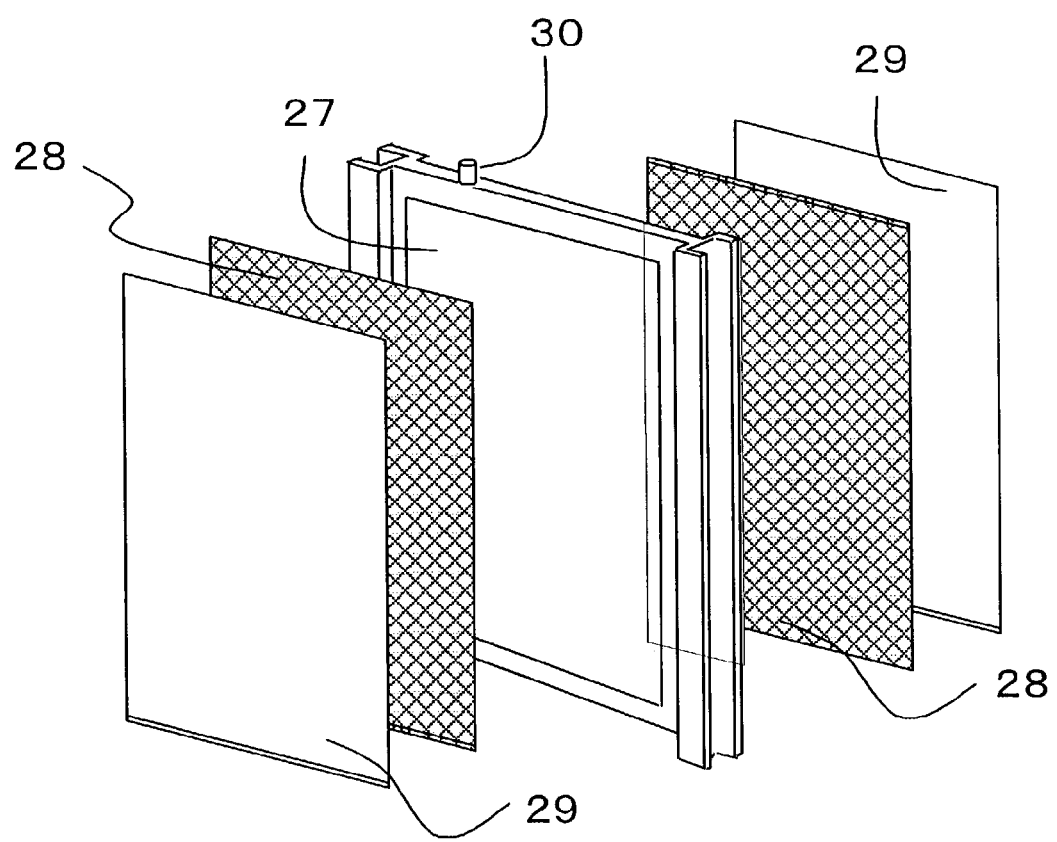
FIG. 12 shows an example of a plate-and-frame element.

FIG. 12 shows an example of a plate-and-frame element. A permeate spacer 28 and a porous membrane 29 are disposed in that order on both surfaces of a supporting plate 27 having a high stiffness and the periphery is water-tightly fixed. Each surface of the supporting plate 27 has protuberances and a recess. The porous membrane 29 filters out impurities in water. The permeate spacer 28 is intended to efficiently deliver the permeate filtered through the porous membrane 29 to the supporting plate 27. The permeate flowing to the supporting plate 27 is taken out outside through the recesses of the supporting plate 27. The permeate spacer 28 and the porous membrane 29 are disposed at only one surface side of the supporting plate 27. However, by disposing them at both surfaces, the membrane area can be increased.

In such an element having the above-described structure, the permeate filtered through the porous membrane 29 passes through the permeate spacer 28 and the recess of the supporting plate 27, and is finally taken out of a permeate outlet 30 to the outside of the element.

A porous membrane module is such that a plurality of above-described elements are disposed, in a housing, parallel to one another such as to form spaces between the surfaces thereof.

Figure 13:
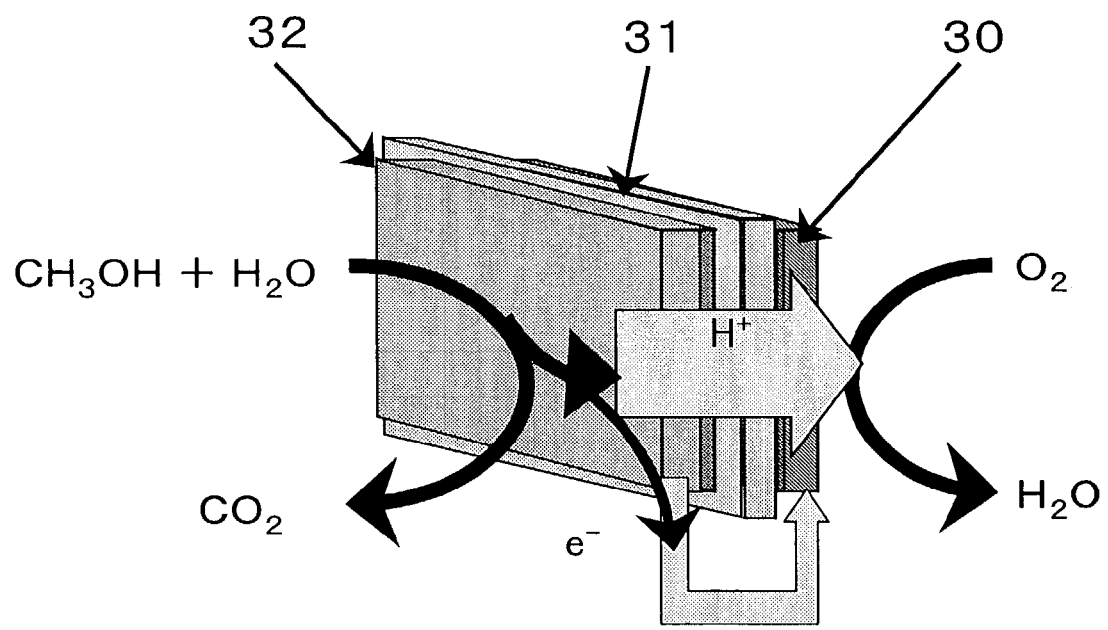
FIG. 13 is a schematic illustration of an MEA of a direct methanol fuel cell.

A fuel cell membrane will now be described with reference to a drawing. FIG. 13 is a schematic illustration of an MEA (membrane electrode assembly) of a direct methanol fuel cell. An electrolyte 31 is disposed between an anode 32 and a cathode 30. By supplying methanol, acting as a fuel, to the anode side, an electromotive force is generated. The pores of the porous membrane of the present invention is impregnated with an electrolyte, such as a polymer electrolyte. Thus, the porous membrane is used as the electrolyte membrane 31.

The present invention will further be described using concrete examples. However, the present invention is not limited by these examples.

In order to determine the mean pore size of porous membranes and the mean diameter of the spherical structure in examples, a cross section of each porous membrane was photographed at a magnification of 1,000 or 10,000 through an SEM (S-800) (manufactured by Hitachi, Ltd.). The pore sizes and the diameters in the spherical structure of arbitrary 10 to 50 pores were measured and number-averaged. In order to determine the mean pore size in the surface of a porous membrane, a cross section of the porous membrane was photographed at a magnification of 1,000 or 10,000 through the above-mentioned SEM. The pore sizes of arbitrary 10 to 50 pores were measured and number-averaged.

The measurements of the water permeability and rejection property of the hollow fiber porous membrane were performed on a miniature module of 200 mm in length including four hollow fiber membranes. In the case of the flat porous membrane, the measurements were performed on a membrane which is cut to a circle of 50 mm in diameter and set in a cylindrical filtration holder. Reverse osmosis membrane treated water was entirely filtered for 30 minutes by external pressure at a temperature of 25° C. and a differential pressure of 16 kPa. The quantity of permeate ($m^3$) was converted into a value per hour (h) and a value per effective membrane area ($m^2$). These values were further multiplied by 50/16 and converted into a value at a pressure of 50 kPa. Thus, the water permeability was determined. Water in which polystyrene latex particles having a mean particle size of 0.843 µm were dispersed was entirely filtered for 30 minutes by external pressure at a temperature of 25° C. and a differential pressure of 16 kPa. The rejection property were determined from the ratio of the latex particle concentration in raw water to that in permeate. These latex particle concentrations are obtained by measuring absorption coefficients of ultraviolet light having a wavelength of 240 nm. The absorption coefficients of ultraviolet light having a wavelength of 240 nm were measured with a spectrophotometer (U-3200) (manufactured by Hitachi, Ltd.).

The fracture strength and the fracture elongation were determined by a tensile test using a tensile tester (TENSILON/RTM-100) (manufactured by Toyo Baldwin). The tensile test was performed on five samples having a measurement length of 50 mm at a tensile speed of 50 mm/min, and obtained fracture strengths and fracture elongations were averaged.

EXAMPLE 1

Figure 2:
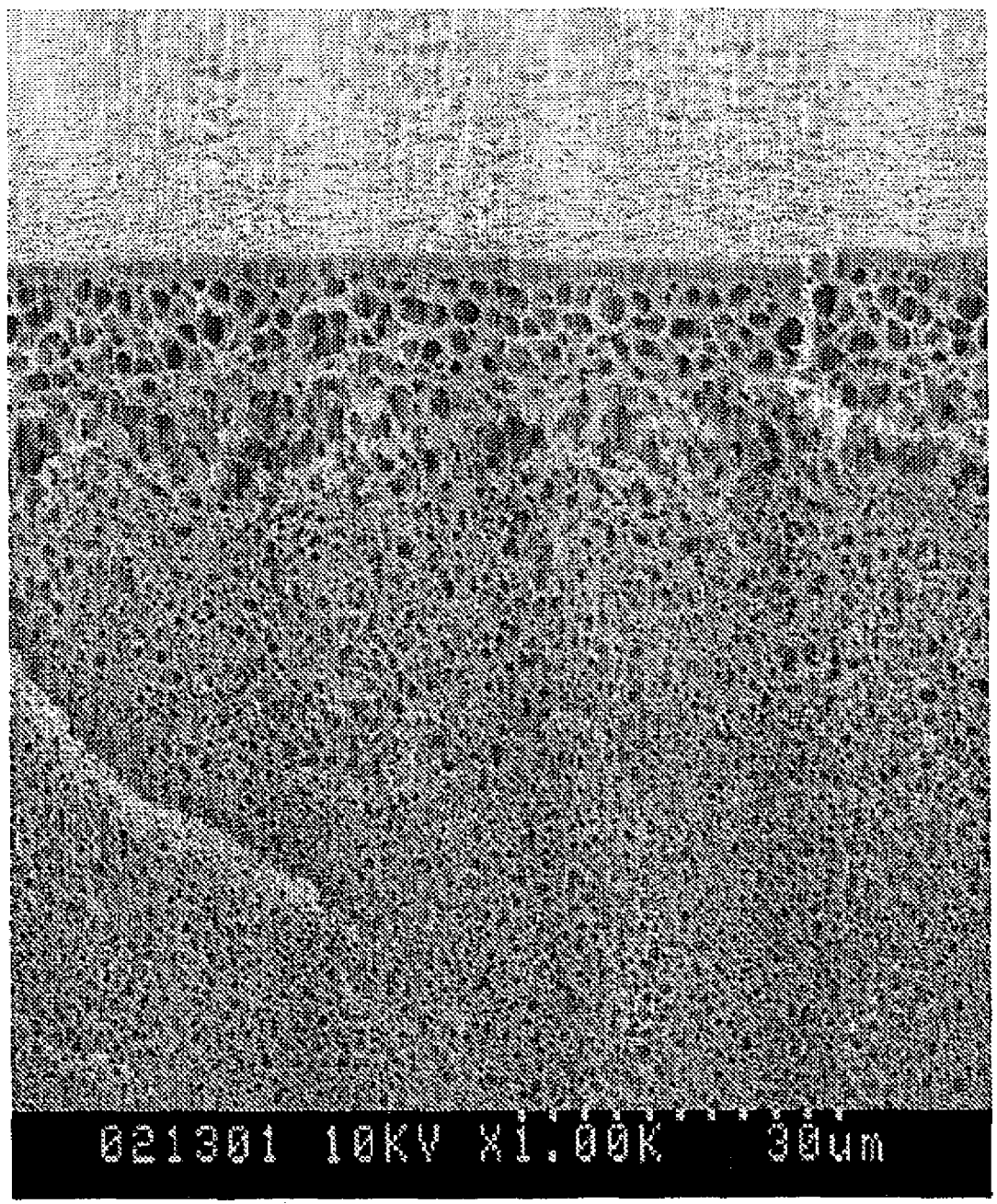
FIG. 2 is a sectional photograph of the area around the external surface of the hollow fiber membrane manufactured by the method in Example 1 according to the present invention.
Figure 3:
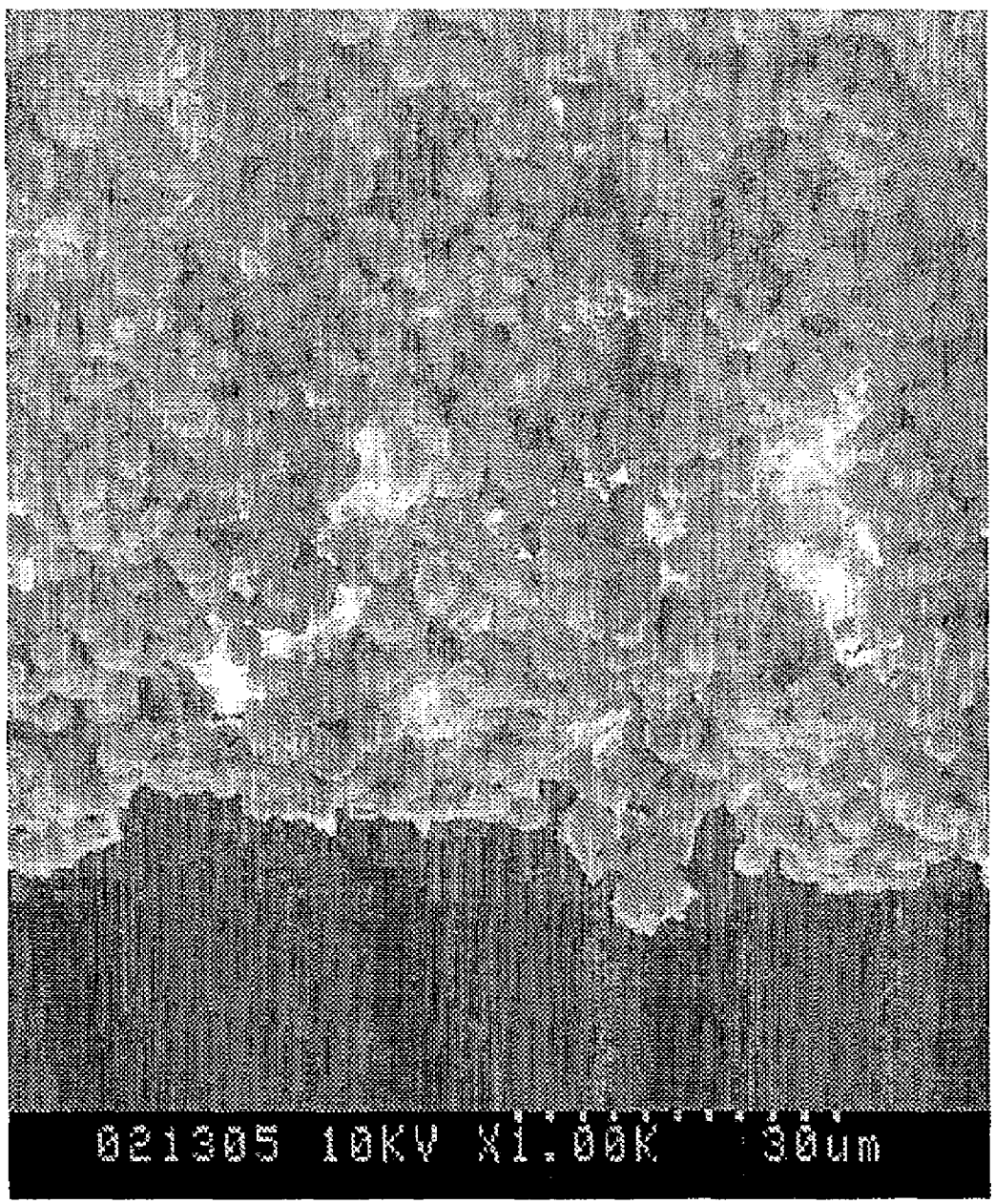
FIG. 3 is a sectional photograph of the area around the interior surface of the hollow fiber membrane manufactured by the method in Example 1 according to the present invention.

A vinylidene fluoride homopolymer having a weight-average molecular weight of 417 thousand in an amount of 38 percent by weight was mixed with 31 percent by weight of γ-butyrolactone and 31 percent by weight of diethylene glycol and dissolved at a temperature of 200° C. This resin solution was discharged with γ-butyrolactone, acting as a lumen forming fluid, from a double co-extrusion head with a temperature of 190° C., and was solidified in a bath with a temperature of 12° C. containing an aqueous solution of 80 percent by weight γ-butyrolactone. The resulting hollow fiber membrane had an outer diameter of 1.60 mm and an inner diameter of 0.90 mm. FIG. 1 shows an SEM photograph of an entire section of the hollow fiber membrane; FIG. 2 shows an SEM photograph of a section around the external surface; and FIG. 3 shows an SEM photograph of a section around the internal surface. The area around the external surface had a three-dimensional network structure and the area around the internal surface had a spherical structure. Hence, it has been shown that the three-dimensional network structure and the spherical structure coexist. The mean pore size of the three-dimensional network structure was 1.63 µm, and the mean diameter of the spherical structure was 4.06 µm. The water permeability at 50 kPa and 25° C. was 0.30 $m^3/m^2 \cdot h$. The rejection for particles having a particle size of 0.843 µm was 98%. The fracture strength and the fracture elongation were 7.8 MPa and 104%, respectively. Thus, the hollow fiber membrane had a dense surface and exhibited excellent water permeability, rejection properties, strength, and elongation.

EXAMPLE 2

A vinylidene fluoride homopolymer having a weight-average molecular weight of 417 thousand in an amount of 38 percent by weight was mixed with 31 percent by weight of γ-butyrolactone and 31 percent by weight of diethylene glycol and dissolved at a temperature of 200° C. This resin solution was discharged with γ-butyrolactone, acting as a lumen forming fluid, from a double co-extrusion head with a temperature of 180° C., and was solidified in a bath with a temperature of 17° C. containing an aqueous solution of 80 percent by weight γ-butyrolactone. The resulting hollow fiber membrane had an outer diameter of 1.50 mm and an inner diameter of 0.92 mm. The area around the external surface had a three-dimensional network structure and the area around the internal surface had a spherical structure. Hence, it has been shown that the three-dimensional network structure and the spherical structure coexist. The mean pore size of the three-dimensional network structure was 1.73 μm, and the mean diameter of the spherical structure was 4.89 μm. The water permeability at 50 kPa and 25° C. was 0.35 m$^3$/m$^2$·h. The rejection for particles having a particle size of 0.843 μm was 97%. The fracture strength and the fracture elongation were 8.8 MPa and 100%, respectively. Thus, the hollow fiber membrane had a dense surface and exhibited excellent water permeability, rejection properties, strength, and elongation.

EXAMPLE 3

A vinylidene fluoride homopolymer having a weight-average molecular weight of 417 thousand in an amount of 38 percent by weight was mixed with 41 percent by weight of γ-butyrolactone and 21 percent by weight of diethylene glycol and dissolved at a temperature of 200° C. This resin solution was discharged with γ-butyrolactone, acting as a lumen forming fluid, from a double co-extrusion head with a temperature of 160° C., and was solidified in a bath with a temperature of 12° C. containing an aqueous solution of 80 percent by weight γ-butyrolactone. The resulting hollow fiber membrane had an outer diameter of 1.54 mm and an inner diameter of 0.93 mm. The area around the external surface had a three-dimensional network structure and the area around the internal surface had a spherical structure. Hence, it has been shown that the three-dimensional network structure and the spherical structure coexist. The mean pore size of the three-dimensional network structure was 1.26 μm, and the mean diameter of-the spherical structure was 2.61 μm. The water permeability at 50 kPa and 25° C. was 0.20 m$^3$/m$^2$·h. The rejection for particles having a particle size of 0.843 μm was 99%. The fracture strength and the fracture elongation were 5.5 MPa and 99%, respectively. Thus, the hollow fiber membrane had a dense surface and exhibited excellent water permeability, rejection properties, strength, and elongation.

EXAMPLE 4

A vinylidene fluoride homopolymer having a weight-average molecular weight of 417 thousand in an amount of 38 percent by weight was mixed with 41 percent by weight of γ-butyrolactone and 21 percent by weight of diethylene glycol and dissolved at a temperature of 200° C. This resin solution was discharged with γ-butyrolactone, acting as a lumen forming fluid, from a double co-extrusion head with a temperature of 150° C., and was solidified in a bath with a temperature of 14° C. containing an aqueous solution of 80 percent by weight γ-butyrolactone. The resulting hollow fiber membrane had an outer diameter of 1.56 mm and an inner diameter of 0.98 mm. The area around the external surface had a three-dimensional network structure and the area around the internal surface had a spherical structure. Hence, it has been shown that the three-dimensional network structure and the spherical structure coexist. The mean pore size of the three-dimensional network structure was 1.22 μm, and the mean diameter of the spherical structure was 3.51 μm. The water permeability at 50 kPa and 25° C. was 0.25 m$^3$/m$^2$·h. The rejection for particles having a particle size of 0.843 μm was 98%. The fracture strength and the fracture elongation were 6.0 MPa and 23%, respectively. Thus, the hollow fiber membrane had a dense surface and exhibited excellent water permeability, rejection properties, strength, and elongation.

EXAMPLE 5

A vinylidene fluoride homopolymer having a weight-average molecular weight of 417 thousand in an amount of 38 percent by weight was mixed with 31 percent by weight of γ-butyrolactone and 31 percent by weight of diethylene glycol and dissolved at a temperature of 200° C. This resin solution was discharged from a slit head with a temperature of 190° C. γ-butyrolactone with a temperature of 12° C. was sprayed onto on surface of the discharged resin and an aqueous solution of 80 percent by weight of γ-butyrolactone was sprayed onto the other surface. Thus the resin was solidified. The resulting flat membrane had a thickness of 0.175 mm. One surface of the resin had a three-dimensional network structure and the other surface had a spherical structure. Hence, it has been shown that the three-dimensional network structure and the spherical structure coexist. The mean pore size of the three-dimensional network structure was 1.60 μm, and the mean diameter of the spherical structure was 4.10 μm. The water permeability at 50 kPa and 25° C. was 0.25 m$^3$/m$^2$·h. The rejection for particles having a particle size of 0.843 μm was 98%. The fracture strength and the fracture elongation were 7.5 MPa and 40%, respectively. Thus, the flat membrane had a dense surface and exhibited excellent water permeability, rejection properties, strength, and elongation.

COMPARATIVE EXAMPLE 1

A vinylidene fluoride homopolymer having a weight-average molecular weight of 417 thousand was mixed with dimethyl sulfoxide at a ratio of 20 to 80 percent by weight, respectively, and was dissolved at a temperature of 70° C. This resin solution was discharged with an aqueous solution of 50 percent by weight dimethyl sulfoxide, acting as a lumen forming fluid, from a double co-extrusion head with a temperature of 50° C., and was solidified in a bath with a temperature of 50° C. containing an aqueous solution of 50 percent by weight dimethyl sulfoxide. The resulting hollow fiber membrane had an outer diameter of 1.40 mm and an inner diameter of 0.98 mm. The external surface of the resin had a dense layer and the internal surface had an asymmetrical three-dimensional network structure with macro voids. There was no spherical structure. The water permeability at 50 kPa and 25° C. was as low as 0.08 m$^3$/m$^2$·h. The rejection for particles having a particle size of 0.843 μm was 99%. The fracture strength and the fracture elongation were 1.0 MPa and 48%, respectively. Thus, the strength was low.

COMPARATIVE EXAMPLE 2

Figure 4:
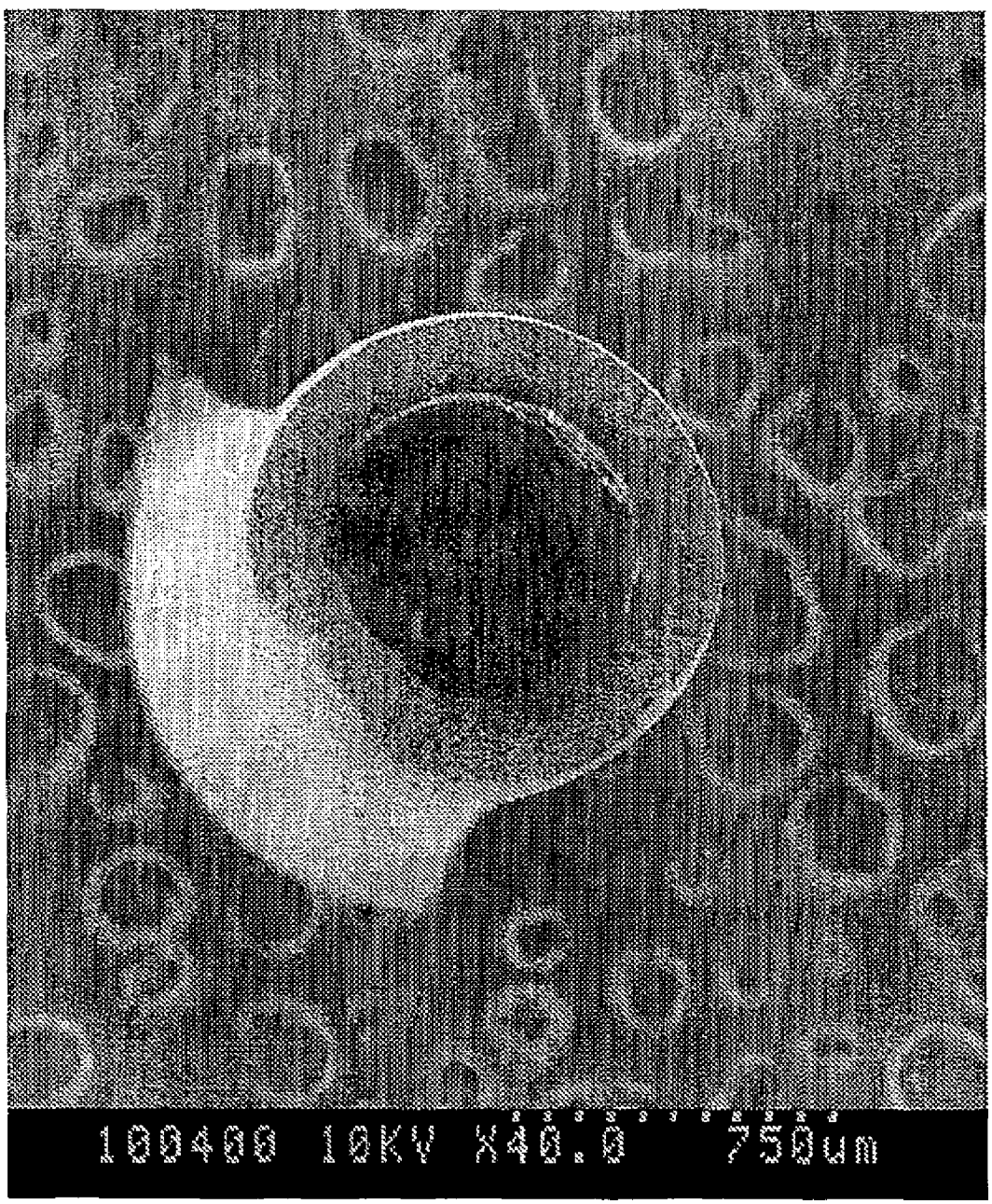
FIG. 4 is a cross-sectional photograph of a hollow fiber membrane manufactured by a method in Comparative Example 2 in association with the present invention.
Figure 5:
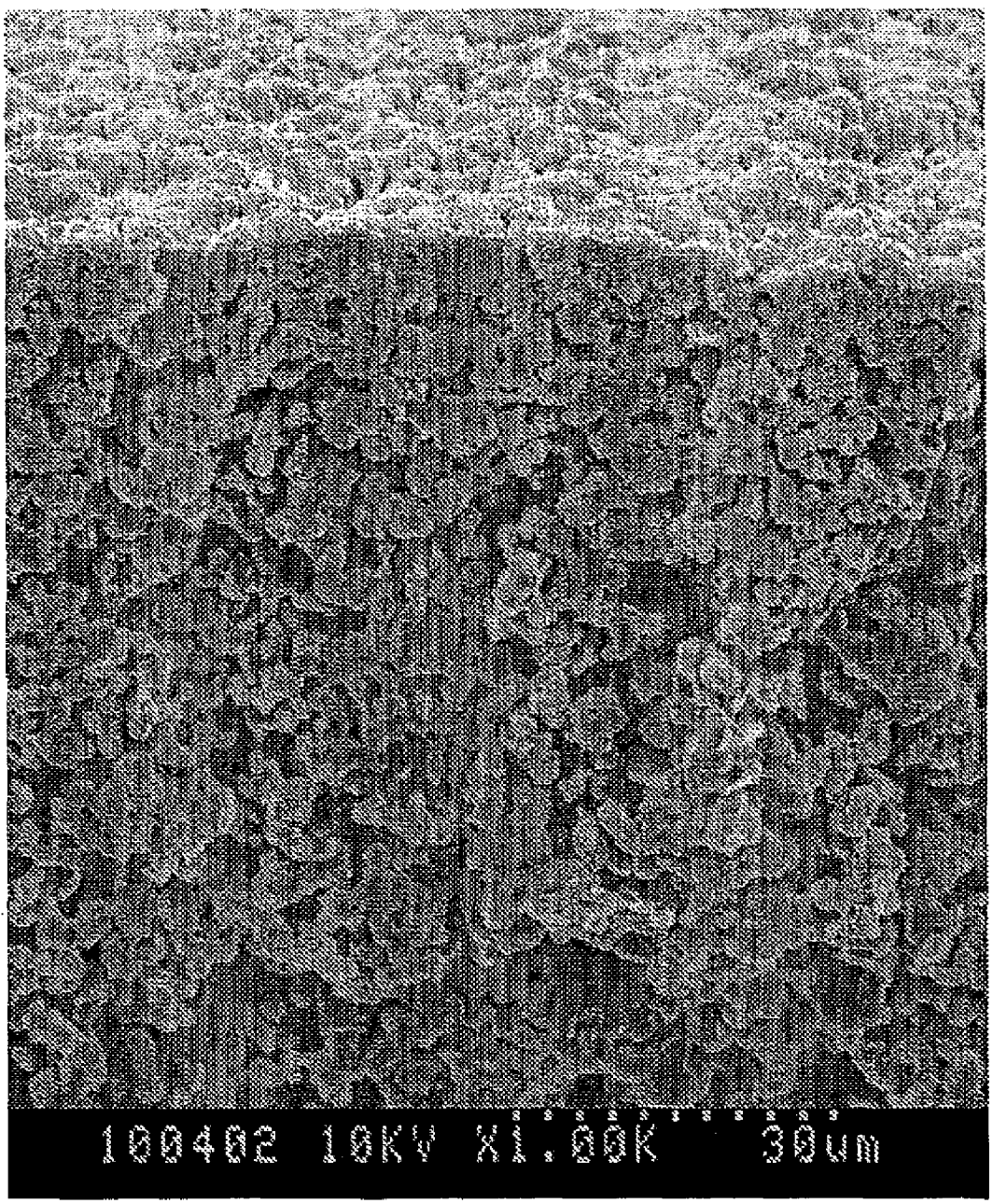
FIG. 5 is a sectional photograph of the area around the external surface of the hollow fiber membrane manufactured by the method in Comparative Example 2 in association with the present invention.
Figure 6:
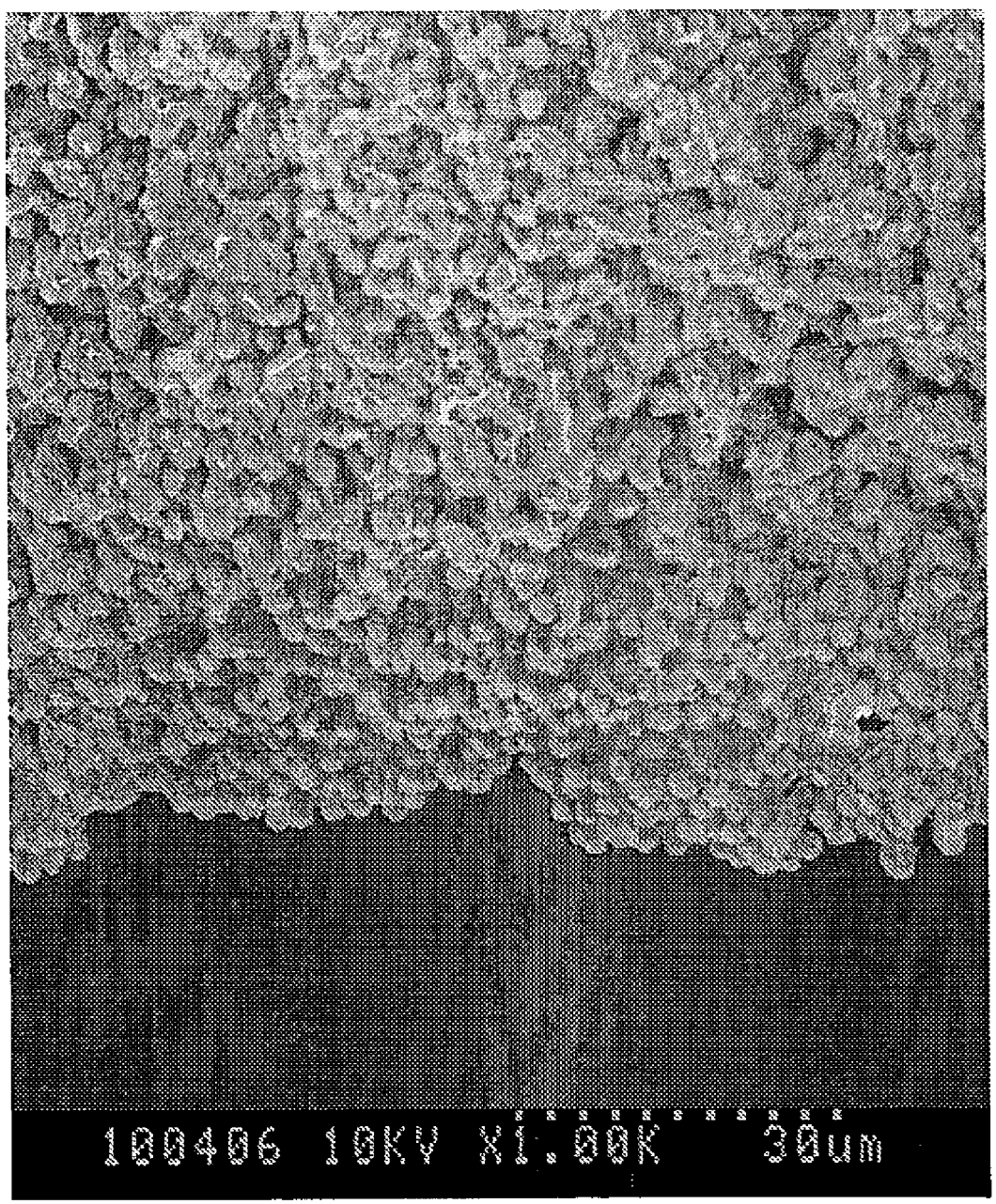
FIG. 6 is a sectional photograph of the area around the interior surface of a hollow fiber membrane manufactured by the method in Comparative Example 2 in association with the present invention.

A vinylidene fluoride homopolymer having a weight-average molecular weight of 417 thousand was mixed with γ-butyrolactone at a ratio of 38 to 62 percent by weight, respectively, and was dissolved at a temperature of 170° C. This resin solution was discharged with γ-butyrolactone, acting as a lumen forming fluid, from a double co-extrusion head with a temperature of 100° C., and was solidified in a cool bath with a temperature of 20° C. containing an aqueous solution of 80 percent by weight γ-butyrolactone. The resulting hollow fiber membrane had an outer diameter of 1.01 mm and an inner diameter of 0.72 mm. FIG. 4 shows an SEM photograph of an entire section of this hollow fiber membrane; FIG. 5 shows an SEM photograph of a section around the external surface; and FIG. 6 shows an SEM photograph of a section around the internal surface. This membrane had only a spherical structure having a mean diameter of 2.75 μm. The water permeability at 50 kPa and 25° C. was 0.30 $M^3/m^2 \cdot h$. The rejection for particles having a particle size of 0.843 μm was 80%. The fracture strength and the fracture elongation were 5.3 MPa and 48%, respectively. Although the hollow fiber membrane exhibited an excellent water permeability, strength, and elongation, its rejection properties were inferior.

EXAMPLE 6

A catalyst-supporting carbon (catalyst: 29.2 percent by weight of platinum and 15.8 percent by weight of ruthenium, carbon: Vulcan (registered trade mark) XC-72 produced by Cabot) was added into a Nafion (registered trade mark) solution (bought from Aldrich) such that the weight ratio was 1 to 1. The mixture was sufficiently stirred to prepare a catalyst-polymer composition. This catalyst-polymer composition was applied onto one surface of a carbon paper TGP-H-060, produced by Toray, to prepare an electrode base with an electrode catalyst layer, supporting 3 $mg/cm^2$ of platinum.

On the other hand, the flat membrane produced in Example 5 was immersed in a Nafion (registered trade mark) solution (bought from Aldrich) and subsequently dried to prepare an ion exchange membrane. Two electrode bases with an electrode catalyst layer, described above, were layered on both surfaces of the resulting ion exchange membrane. The ion exchange membrane serves as an electrolyte membrane. Respective two electrode bases serve as a cathode and an anode. The electrodes bases were disposed such that each electrode catalyst layer side of the bases opposes the ion exchange membrane. This composite was hot-pressed under the conditions of 130° C. and 5 MPa. Thus, a membrane-electrode integrated unit was prepared.

The resulting membrane-electrode integrated unit was incorporated into a fuel cell. An aqueous solution of 64 percent by weigh methanol and air were supplied to the anode side and the cathode side, respectively. The fuel cell outputs a maximum power of 0.5 $mW/cm^2$ and, thus, exhibited excellently high power properties. This is probably because the swelling of the ion exchange membrane with methanol is suppressed and the leak of methanol through the ion exchange membrane from the anode to cathode, that is, crossover, is prevented.

COMPARATIVE EXAMPLE 3

Electrode bases with an electrode catalyst layer, prepared under the same conditions as in Example 6 were layered on both surfaces of an ion exchange membrane Nafion (registered trade mark) 117 (0.175 mm in thickness), produced by Du Pont. The electrode bases were disposed such that each electrode catalyst layer side of the bases opposes the ion exchange membrane. This composite was hot-pressed under the same conditions as in Example 6. Thus, a membrane-electrode integrated unit was prepared.

The resulting membrane-electrode integrated unit was evaluated under the same conditions as in Example 6. The maximum power was as low as 0.1 $mW/cm^2$. This is probably because the ion exchange membrane Nafion (registered trade mark) 117 was welled with methanol and, consequently, crossover of methanol occurred.

EXAMPLES 7 to 18 and COMPARATIVE EXAMPLES 4 to 15

Hollow fiber membranes were prepared by the following method. First, hollow fiber membranes of Comparative Examples 4 to 15 were prepared under the conditions shown in Table 1. Vinylidene fluoride homopolymer was mixed with a solvent to be dissolved. The solution was discharged with a lumen forming fluid from a double co-extrusion head and solidified in a cool bath. Each hollow fiber membrane had only a spherical structure.

Next, A mixed solution containing 13 percent by weight of vinylidene fluoride homopolymer having a weight-average molecular weight of 284 thousand, 5 percent by weight of polyethylene glycol having a weight-average molecular weight of 20 thousand, 79 percent by weight of dimethylformamide, and 3 percent by weight of water was uniformly applied onto the surfaces of the hollow fiber membranes of Comparative Examples 4 to 15. These hollow fiber membranes were immediately immersed in a mixed solvent containing 95 percent by weight of water and 5 percent by weight of dimethylformamide to solidify the solution. These are defined as Examples 7 to 18. These hollow fiber membranes each had a three-dimensional network structure on the external side and a spherical structure on the internal side. The thickness of the three-dimensional network structure was 20 μm. Table 2 show properties of hollow fiber membranes of Examples 7 to 18 and Comparative Examples 4 to 15. Each example exhibited higher rejection properties than those of the comparative examples.

TABLE 1

| | PVDF weight-average molecular weight | Solvent | Ratio of polymer to solvent | Dissolving temp. (° C.) | Lumen forming fluid composition | Head temp. (° C.) | Cool bath composition | Cool bath temp. (° C.) |
|---|---|---|---|---|---|---|---|---|
| Comparative Example 4 | 284,000 | Cyclohexanone | 55:45 | 160 | Cyclohexanone 100% | 125 | 90% Cyclohexanone aq | 30 |
| Comparative Example 5 | 358,000 | Cyclohexanone | 50:50 | 160 | Cyclohexanone 100% | 120 | 85% Cyclohexanone aq | 25 |
| Comparative Example 6 | 417,000 | Cyclohexanone | 40:60 | 160 | Cyclohexanone 100% | 130 | 80% Cyclohexanone aq | 20 |
| Comparative Example 7 | 417,000 | Cyclohexanone | 20:80 | 140 | 95% Cyclohexanone aq | 95 | 80% Cyclohexanone aq | 10 |
| Comparative Example 8 | 572,000 | Cyclohexanone | 35:65 | 170 | Cyclohexanone 100% | 155 | 80% Cyclohexanone aq | 15 |
| Comparative Example 9 | 417,000 | γ-butyrolactone | 40:60 | 170 | γ-butyrolactone 100% | 100 | 80% γ-butyrolactone aq | 27 |

TABLE 1-continued

|  | PVDF weight-average molecular weight | Solvent | Ratio of polymer to solvent | Dissolving temp. (° C.) | Lumen forming fluid composition | Head temp. (° C.) | Cool bath composition | Cool bath temp. (° C.) |
|---|---|---|---|---|---|---|---|---|
| Comparative Example 10 | 417,000 | γ-butyrolactone | 45:55 | 170 | γ-butyrolactone 100% | 120 | 80% γ-butyrolactone aq | 27 |
| Comparative Example 11 | 417,000 | γ-butyrolactone | 38:62 | 170 | γ-butyrolactone 100% | 95 | 80% γ-butyrolactone aq | 28 |
| Comparative Example 12 | 417,000 | γ-butyrolactone | 43:57 | 170 | γ-butyrolactone 100% | 110 | 80% γ-butyrolactone aq | 28 |
| Comparative Example 13 | 417,000 | γ-butyrolactone | 50:50 | 170 | γ-butyrolactone 100% | 140 | 80% γ-butyrolactone aq | 27 |
| Comparative Example 14 | 417,000 | γ-butyrolactone | 38:62 | 170 | γ-butyrolactone 100% | 100 | 80% γ-butyrolactone aq | 27 |
| Comparative Example 15 | 358,000 | γ-butyrolactone | 50:50 | 170 | γ-butyrolactone 100% | 113 | 80% γ-butyrolactone aq | 27 |

TABLE 2

|  | Base hollow fiber membrane | Outer diameter (mm) | Inner diameter (mm) | External surface pore size (μm) | Water permeability ($m^3/m^2 \cdot h \cdot 50$ kPa) | Fracture strength (MPa) | Fracture elongation (%) | Rejection property (%) |
|---|---|---|---|---|---|---|---|---|
| Example 7 | Comparative Example 4 | 1.74 | 0.99 | 0.04 | 0.20 | 3.29 | 75 | 99 |
| Example 8 | Comparative Example 5 | 1.67 | 1.00 | 0.03 | 0.27 | 5.03 | 68 | 99 |
| Example 9 | Comparative Example 6 | 1.56 | 0.88 | 0.10 | 0.35 | 6.70 | 59 | 97 |
| Example 10 | Comparative Example 7 | 1.48 | 0.92 | 0.19 | 0.39 | 3.90 | 63 | 95 |
| Example 11 | Comparative Example 8 | 1.55 | 0.89 | 0.18 | 0.20 | 5.66 | 58 | 95 |
| Example 12 | Comparative Example 9 | 1.32 | 0.78 | 0.09 | 0.15 | 4.40 | 60 | 97 |
| Example 13 | Comparative Example 10 | 1.26 | 0.74 | 0.09 | 0.20 | 5.76 | 59 | 97 |
| Example 14 | Comparative Example 11 | 1.37 | 0.99 | 0.05 | 0.40 | 7.10 | 243 | 99 |
| Example 15 | Comparative Example 12 | 1.53 | 1.15 | 0.17 | 2.39 | 4.66 | 70 | 96 |
| Example 16 | Comparative Example 13 | 1.90 | 1.14 | 0.10 | 0.41 | 3.35 | 80 | 97 |
| Example 17 | Comparative Example 14 | 1.44 | 0.85 | 0.04 | 0.26 | 7.02 | 63 | 99 |
| Example 18 | Comparative Example 15 | 1.38 | 0.93 | 0.06 | 0.31 | 10.69 | 75 | 98 |
| Comparative Example 4 | — | 1.70 | 0.99 | 0.78 | 0.35 | 3.53 | 75 | 86 |
| Comparative Example 5 | — | 1.63 | 1.00 | 0.69 | 0.455 | 5.43 | 68 | 87 |
| Comparative Example 6 | — | 1.52 | 0.88 | 2.20 | 0.605 | 7.23 | 59 | 76 |
| Comparative Example 7 | — | 1.44 | 0.92 | 5.00 | 0.675 | 4.27 | 63 | 50 |
| Comparative Example 8 | — | 1.51 | 0.89 | 4.60 | 0.34 | 6.13 | 58 | 53 |
| Comparative Example 9 | — | 1.28 | 0.78 | 1.80 | 0.24 | 4.85 | 60 | 79 |
| Comparative Example 10 | — | 1.22 | 0.74 | 1.70 | 0.34 | 6.37 | 59 | 80 |
| Comparative Example 11 | — | 1.33 | 0.99 | 0.95 | 0.68 | 8.07 | 243 | 84 |
| Comparative Example 12 | — | 1.49 | 1.15 | 4.30 | 4.11 | 5.29 | 70 | 56 |
| Comparative Example 13 | — | 1.86 | 1.14 | 2.10 | 0.70 | 3.58 | 80 | 77 |
| Comparative Example 14 | — | 1.40 | 0.85 | 0.80 | 0.445 | 7.67 | 63 | 85 |
| Comparative Example 15 | — | 1.34 | 0.93 | 1.10 | 0.535 | 11.94 | 75 | 83 |

EXAMPLES 19 to 30 and COMPARATIVE EXAMPLES 16 to 27

Figure 7:
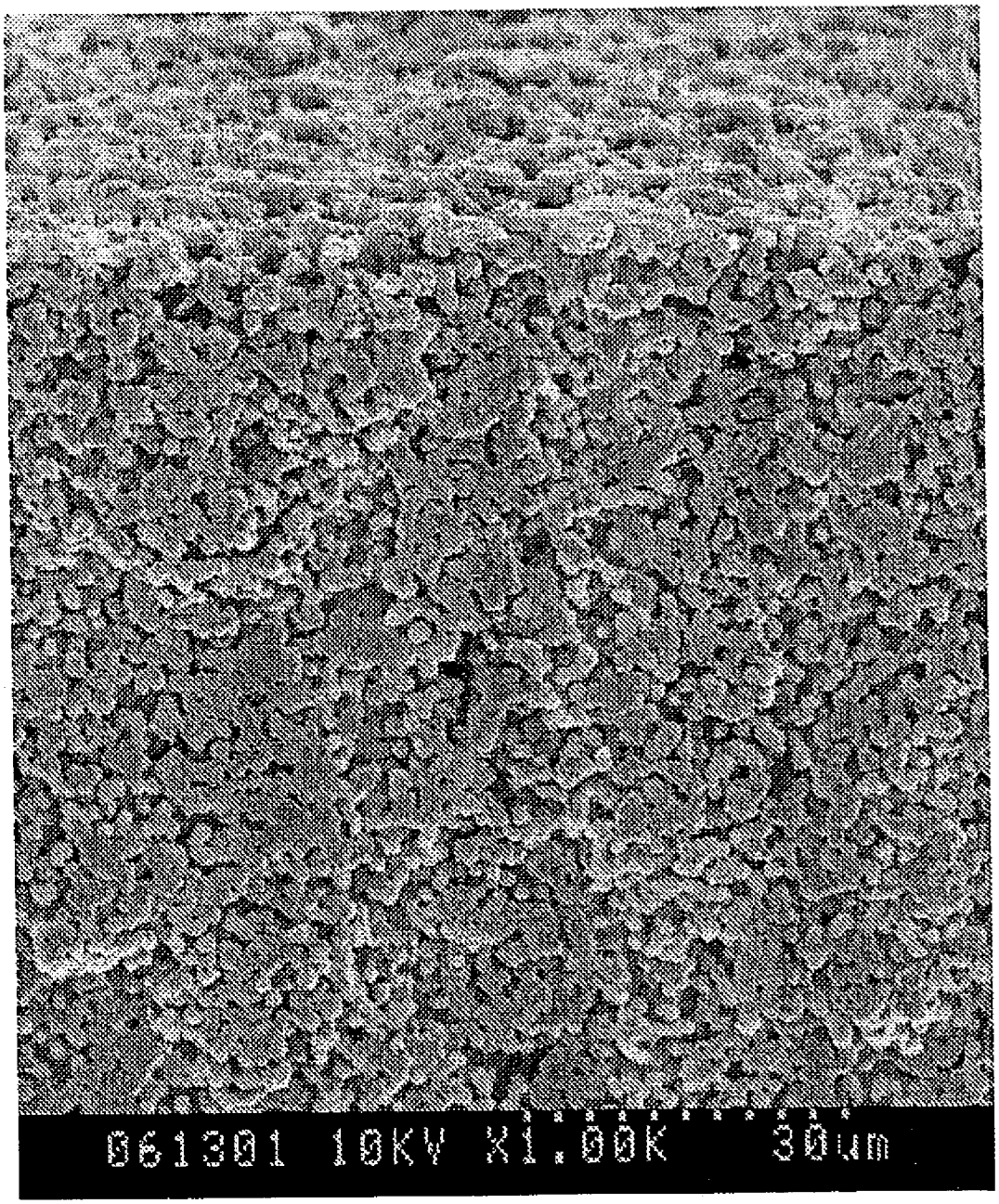
FIG. 7 is a sectional photograph of the area around the external surface of a hollow fiber membrane manufactured by a method in Comparative Example 23 in association with the present invention.
Figure 8:
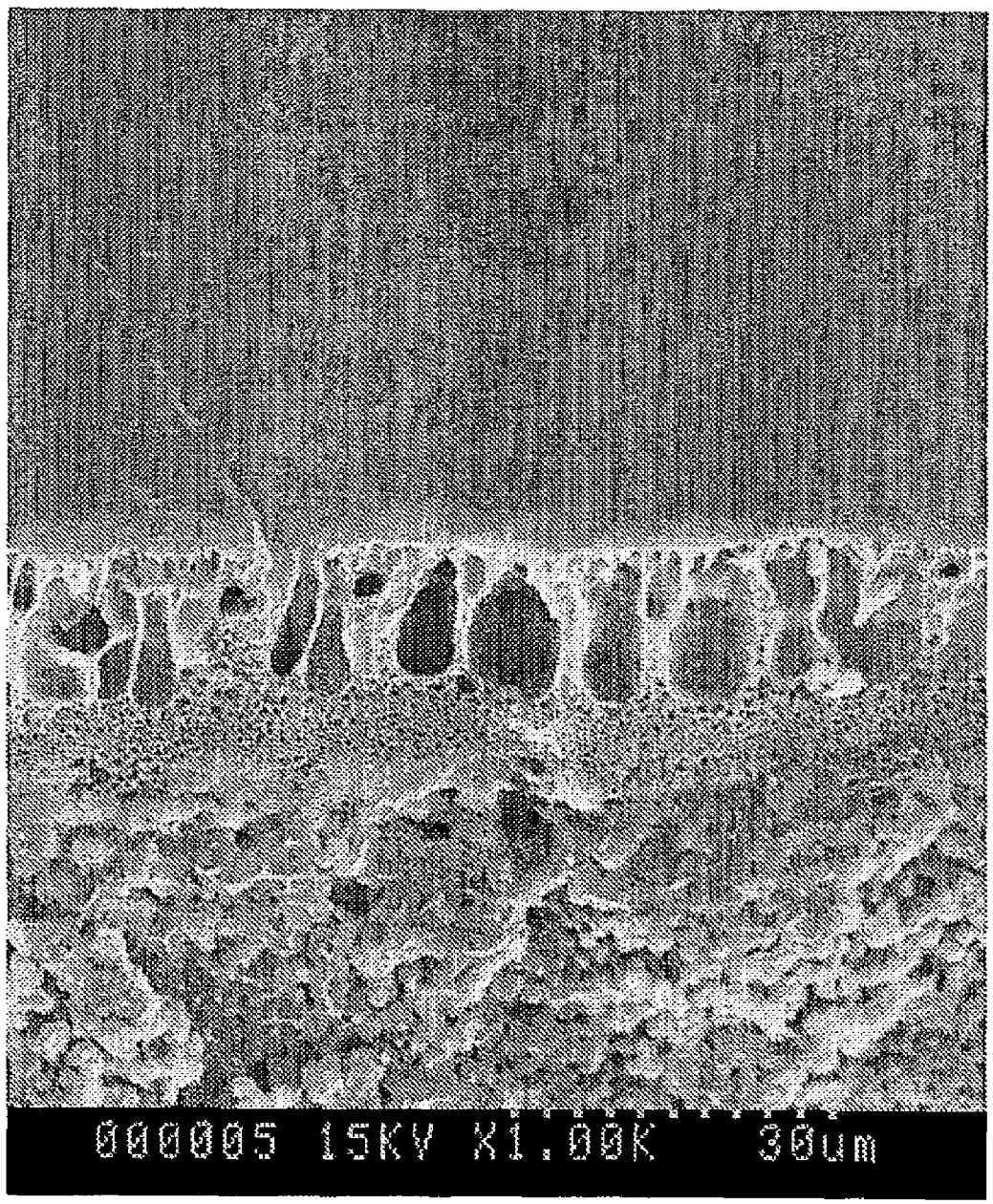
FIG. 8 is a sectional photograph of the area around the external surface of a hollow fiber membrane manufactured by a method in Example 26 according to the present invention.

Hollow fiber membranes were prepared by the following method. First, hollow fiber membranes of Comparative Examples 16 to 27 were prepared under the conditions shown in Table 3. Vinylidene fluoride homopolymer was mixed with a solvent to be dissolved. The solution was discharged with a lumen forming fluid from a double co-extrusion head and solidified in a cool bath. Then, the product was drawn in a drawing bath. FIG. 7 shows an SEM photograph of a cross section around the external surface of a hollow fiber membrane prepared in Comparative Example 23, as a typical example. Each hollow fiber membrane of Comparative Examples 16 to 27 had only a spherical structure. A mixed solution containing 13 percent by weight of vinylidene fluoride homopolymer having a weight-average molecular weight of 284 thousand, 5 percent by weight of polyethylene glycol having a weight-average molecular weight of 20 thousand, 79 percent by weight of dimethylformamide, and 3 percent by weight of water was uniformly applied onto the surfaces of the hollow fiber membranes of Comparative Examples 16 to 27. These hollow fiber membranes were immediately immersed in a mixed solvent containing 95 percent by weight of water and 5 percent by weight of dimethylformamide to solidify the solution. These are defined as Examples 19 to 30. FIG. 8 shows an SEM photograph of a cross section around the external surface of a hollow fiber membrane prepared in Example 26, as a typical example. Each hollow fiber membrane of Examples 19 to 30 had a spherical structure on the internal side and a three-dimensional network structure on the external side. The thickness of the three-dimensional network structure was 20 μm. Table 4 show properties of hollow fiber membranes of Examples 19 to 30 and Comparative Examples 16 to 27. Each example exhibited higher rejection properties than those of the comparative examples.

TABLE 3

| | PVDF weight-average molecular weight | Solvent | Ratio of polymer to solvent | Dissolving temp. (° C.) | Lumen forming fluid composition | Head temp. (° C.) |
|---|---|---|---|---|---|---|
| Comparative Example 16 | 284,000 | Cyclohexanone | 55:45 | 160 | Cyclohexanone 100% | 125 |
| Comparative Example 17 | 358,000 | Cyclohexanone | 50:50 | 160 | Cyclohexanone 100% | 120 |
| Comparative Example 18 | 417,000 | Cyclohexanone | 40:60 | 160 | Cyclohexanone 100% | 130 |
| Comparative Example 19 | 417,000 | Cyclohexanone | 20:80 | 140 | 95% Cyclohexanone aq | 95 |
| Comparative Example 20 | 572,000 | Cyclohexanone | 35:65 | 170 | Cyclohexanone 100% | 155 |
| Comparative Example 21 | 417,000 | γ-butyrolactone | 40:60 | 170 | γ-butyrolactone 100% | 100 |
| Comparative Example 22 | 417,000 | γ-butyrolactone | 45:55 | 170 | γ-butyrolactone 100% | 120 |
| Comparative Example 23 | 417,000 | γ-butyrolactone | 38:62 | 170 | γ-butyrolactone 100% | 95 |
| Comparative Example 24 | 417,000 | γ-butyrolactone | 43:57 | 170 | γ-butyrolactone 100% | 110 |
| Comparative Example 25 | 417,000 | γ-butyrolactone | 50:50 | 170 | γ-butyrolactone 100% | 140 |
| Comparative Example 26 | 417,000 | Isophorone | 40:60 | 155 | 100% Isophorone | 100 |
| Comparative Example 27 | 417,000 | Dimethyl sulfoxide | 30:70 | 95 | Dimethyl sulfoxide 90% aq | 95 |

| | Cool bath composition | Cool bath temp. (° C.) | Drawing bath | Drawing bath temp. (° C.) | Draw ratio (Times) |
|---|---|---|---|---|---|
| Comparative Example 16 | 90% Cyclohexanone aq | 30 | Water | 88 | 2.0 |
| Comparative Example 17 | 85% Cyclohexanone aq | 25 | Polyethylene glycol (weight-average molecular weight: 400) | 110 | 2.5 |
| Comparative Example 18 | 80% Cyclohexanone aq | 20 | Water | 85 | 3.0 |
| Comparative Example 19 | 80% Cyclohexanone aq | 10 | Water | 85 | 3.5 |
| Comparative Example 20 | 80% Cyclohexanone aq | 15 | Water | 85 | 4.0 |
| Comparative Example 21 | 80% γ-butyrolactone aq | 27 | Water | 80 | 2.2 |
| Comparative Example 22 | 80% γ-butyrolactone aq | 27 | Water | 80 | 1.6 |
| Comparative Example 23 | 80% γ-butyrolactone aq | 28 | Water | 81 | 1.7 |
| Comparative Example 24 | 80% γ-butyrolactone aq | 28 | Water | 80 | 1.5 |

TABLE 3-continued

| | | | | | |
|---|---|---|---|---|---|
| Comparative Example 25 | 80% γ-butyrolactone aq | 27 | Water | 87 | 1.9 |
| Comparative Example 26 | 80% Isophorone aq | 27 | Water | 85 | 3.0 |
| Comparative Example 27 | 90% Dimethyl sulfoxide aq | 27 | Water | 80 | 1.5 |

TABLE 4

| | Base hollow fiber membrane | Outer diameter (mm) | Inner diameter (mm) | External surface pore width (μm) | External surface pore length (μm) | External surface pore size (μm) | Water permeability ($m^3/m^2 \cdot h \cdot 50$ kPa) | Fracture strength (MPa) | Fracture elongation (%) | Rejection property (%) |
|---|---|---|---|---|---|---|---|---|---|---|
| Example 19 | Comparative Example 16 | 1.59 | 0.95 | — | — | 0.04 | 0.55 | 6.76 | 55 | 99 |
| Example 20 | Comparative Example 17 | 1.44 | 0.9 | — | — | 0.03 | 0.73 | 12.35 | 50 | 99 |
| Example 21 | Comparative Example 18 | 1.34 | 0.75 | — | — | 0.12 | 1.05 | 17.42 | 48 | 97 |
| Example 22 | Comparative Example 19 | 1.24 | 0.7 | — | — | 0.18 | 1.40 | 7.27 | 50 | 95 |
| Example 23 | Comparative Example 20 | 1.39 | 0.8 | — | — | 0.19 | 0.61 | 13.34 | 45 | 95 |
| Example 24 | Comparative Example 21 | 1.11 | 0.64 | — | — | 0.04 | 0.50 | 7.89 | 46 | 99 |
| Example 25 | Comparative Example 22 | 1.20 | 0.68 | — | — | 0.03 | 0.99 | 8.81 | 41 | 99 |
| Example 26 | Comparative Example 23 | 1.56 | 0.95 | — | — | 0.04 | 1.27 | 12.79 | 189 | 99 |
| Example 27 | Comparative Example 24 | 1.47 | 1.07 | — | — | 0.12 | 2.91 | 6.39 | 46 | 97 |
| Example 28 | Comparative Example 25 | 1.53 | 0.93 | — | — | 0.11 | 0.79 | 6.94 | 56 | 97 |
| Example 29 | Comparative Example 26 | 1.44 | 0.9 | — | — | 0.17 | 0.82 | 9.98 | 54 | 96 |
| Example 30 | Comparative Example 27 | 1.99 | 1.55 | — | — | 0.05 | 1.19 | 4.25 | 32 | 99 |
| Comparative Example 16 | — | 1.55 | 0.95 | 0.96 | 3.2 | 1.75 | 0.95 | 7.33 | 55 | 79 |
| Comparative Example 17 | — | 1.4 | 0.9 | 0.65 | 2.4 | 1.25 | 1.25 | 13.57 | 50 | 82 |
| Comparative Example 18 | — | 1.3 | 0.75 | 1.95 | 9.8 | 4.37 | 1.80 | 19.05 | 48 | 55 |
| Comparative Example 19 | — | 1.2 | 0.7 | 3.20 | 18.3 | 7.65 | 2.40 | 8.02 | 50 | 25 |
| Comparative Example 20 | — | 1.35 | 0.8 | 2.80 | 26.4 | 8.60 | 1.05 | 14.57 | 45 | 20 |
| Comparative Example 21 | — | 1.07 | 0.64 | 1.10 | 3.0 | 1.82 | 0.85 | 8.83 | 46 | 79 |
| Comparative Example 22 | — | 1.16 | 0.68 | 0.50 | 5.0 | 1.58 | 1.70 | 9.75 | 41 | 81 |
| Comparative Example 23 | — | 1.52 | 0.95 | 1.30 | 4.2 | 2.34 | 2.18 | 14.68 | 189 | 75 |
| Comparative Example 24 | — | 1.43 | 1.07 | 3.00 | 6.2 | 4.31 | 5.00 | 7.21 | 46 | 56 |
| Comparative Example 25 | — | 1.49 | 0.93 | 2.50 | 6.0 | 3.87 | 1.35 | 7.56 | 56 | 62 |
| Comparative Example 26 | — | 1.4 | 0.9 | 3.30 | 15.1 | 7.06 | 1.40 | 10.97 | 54 | 30 |
| Comparative Example 27 | — | 1.95 | 1.55 | 1.00 | 4.1 | 2.02 | 2.05 | 4.73 | 32 | 78 |

EXAMPLES 31 to 42

A solution containing 8 percent by weight of polyacrylonitrile polymer having a weight-average molecular weight of 400 thousand and 92 percent by weight of dimethyl sulfoxide was applied onto the surfaces of Comparative Examples 16 to 27. These hollow fiber membranes were immediately immersed in a mixed solvent containing 90 percent by weight of water and 10 percent by weight of dimethyl sulfoxide to solidify the solution. These are defined as Examples 31 to 42. These hollow fiber membranes of Examples 31 to 42 each had a three-dimensional network structure on the external side and a spherical structure on the internal side. The thickness of the three-dimensional network structure was 20 to 30 μm. Table 5 show properties of hollow fiber membranes of Examples 31 to 42. Each example exhibited higher rejection properties than those of the comparative examples.

TABLE 5

| | Base hollow fiber membrane | Outer diameter (mm) | Inner diameter (mm) | External surface pore width (μm) | External surface pore length (μm) | External surface pore size (μm) | Water permeability (m³/m²·h·50 kPa) | Fracture strength (MPa) | Fracture elongation (%) | Rejection property (%) |
|---|---|---|---|---|---|---|---|---|---|---|
| Example 31 | Comparative Example 16 | 1.60 | 0.95 | — | — | 0.01 | 0.17 | 6.85 | 54 | 99 |
| Example 32 | Comparative Example 17 | 1.44 | 0.9 | — | — | 0.02 | 0.19 | 12.40 | 53 | 99 |
| Example 33 | Comparative Example 18 | 1.35 | 0.75 | — | — | 0.02 | 0.25 | 17.02 | 52 | 99 |
| Example 34 | Comparative Example 19 | 1.25 | 0.7 | — | — | 0.01 | 0.30 | 6.99 | 53 | 99 |
| Example 35 | Comparative Example 20 | 1.39 | 0.8 | — | — | 0.01 | 0.18 | 13.02 | 41 | 99 |
| Example 36 | Comparative Example 21 | 1.12 | 0.64 | — | — | 0.02 | 0.12 | 7.97 | 42 | 99 |
| Example 37 | Comparative Example 22 | 1.20 | 0.68 | — | — | 0.01 | 0.16 | 8.21 | 44 | 99 |
| Example 38 | Comparative Example 23 | 1.57 | 0.95 | — | — | 0.01 | 0.29 | 12.23 | 179 | 99 |
| Example 39 | Comparative Example 24 | 1.48 | 1.07 | — | — | 0.02 | 0.34 | 6.50 | 50 | 99 |
| Example 40 | Comparative Example 25 | 1.53 | 0.93 | — | — | 0.01 | 0.18 | 6.58 | 54 | 99 |
| Example 41 | Comparative Example 26 | 1.45 | 0.9 | — | — | 0.02 | 0.20 | 9.56 | 59 | 99 |
| Example 42 | Comparative Example 27 | 1.99 | 1.55 | — | — | 0.02 | 0.27 | 4.32 | 33 | 99 |

EXAMPLES 43 to 54

A solution containing 2 percent by weight of polysulfone having a weight-average molecular weight of 47 thousand, 6 percent by weight of polysulfone having a weight-average molecular weight of 59 thousand, 3 percent by weight of polyvinylpyrrolidone having a weight-average molecular weight of 1200 thousand, 88 percent by weight of dimethylacetamide, and 1 percent by weight of water was applied onto the surfaces of Comparative Examples 16 to 27. These hollow fiber membranes were immediately immersed in a solidification bath with a temperature of 40° C. containing 10 percent by weight of mixed solvent containing 10 percent by weight of dimethyl sulfoxide, 30 percent by weight of dimethylacetamide, and 60 percent by weight of water to solidify the solution. These are defined as Examples 43 to 54. These hollow fiber membranes of Examples 43 to 54 each had a three-dimensional network structure on the external side and a spherical structure on the internal side. The thickness of the three-dimensional network structure was about 30 μm.

Table 6 show properties of hollow fiber membranes of Examples 43 to 54. Each example exhibited higher rejection properties than those of the comparative examples.

TABLE 6

| | Base hollow fiber membrane | Outer diameter (mm) | Inner diameter (mm) | External surface pore width (μm) | External surface pore length (μm) | External surface pore size (μm) | Water permeability (m³/m²·h·50 kPa) | Fracture strength (MPa) | Fracture elongation (%) | Rejection property (%) |
|---|---|---|---|---|---|---|---|---|---|---|
| Example 43 | Comparative Example 16 | 1.60 | 0.95 | — | — | 0.02 | 0.20 | 6.23 | 56 | 99 |
| Example 44 | Comparative Example 17 | 1.44 | 0.9 | — | — | 0.03 | 0.21 | 12.59 | 60 | 99 |
| Example 45 | Comparative Example 18 | 1.35 | 0.75 | — | — | 0.02 | 0.29 | 17.33 | 53 | 99 |
| Example 46 | Comparative Example 19 | 1.25 | 0.7 | — | — | 0.03 | 0.36 | 6.68 | 70 | 99 |
| Example 47 | Comparative Example 20 | 1.39 | 0.8 | — | — | 0.02 | 0.32 | 13.24 | 45 | 99 |
| Example 48 | Comparative Example 21 | 1.12 | 0.64 | — | — | 0.03 | 0.25 | 8.23 | 46 | 99 |
| Example 49 | Comparative Example 22 | 1.20 | 0.68 | — | — | 0.01 | 0.26 | 8.50 | 42 | 99 |
| Example 50 | Comparative Example 23 | 1.57 | 0.95 | — | — | 0.02 | 0.33 | 12.10 | 180 | 99 |
| Example 51 | Comparative Example 24 | 1.48 | 1.07 | — | — | 0.02 | 0.40 | 6.74 | 63 | 99 |
| Example 52 | Comparative Example 25 | 1.53 | 0.93 | — | — | 0.01 | 0.20 | 6.56 | 55 | 99 |

TABLE 6-continued

|  | Base hollow fiber membrane | Outer diameter (mm) | Inner diameter (mm) | External surface pore width (μm) | External surface pore length (μm) | External surface pore size (μm) | Water permeability ($m^3/m^2 \cdot h \cdot 50$ kPa) | Fracture strength (MPa) | Fracture elongation (%) | Rejection property (%) |
|---|---|---|---|---|---|---|---|---|---|---|
| Example 53 | Comparative Example 26 | 1.45 | 0.9 | — | — | 0.03 | 0.36 | 9.30 | 73 | 99 |
| Example 54 | Comparative Example 27 | 1.99 | 1.55 | — | — | 0.02 | 0.40 | 4.11 | 41 | 99 |

EXAMPLE 55

A vinylidene fluoride homopolymer having a weight-average molecular weight of 358 thousand, a copolymer of ethylene tetrafluoride and vinylidene fluoride (ATOFINA Japan, Kynar (registered trade mark) 7201, weight ratio: 3:7), and cyclohexanone were mixed in amounts of 30, 10, and 60 percent by weight, respectively, and the resins were dissolved at 165° C. This polymer solution was discharged with 100% cyclohexanone, acting as a lumen forming fluid, from a double co-extrusion head with a temperature of 145° C., and was solidified in a cool bath with a temperature of 30° C. containing an aqueous solution of 90 percent by weight cyclohexanone. The product was drawn to 3.0 times in water with a temperature of 80° C. to obtain a hollow fiber membrane. A mixed solution containing 13 percent by weight of vinylidene fluoride homopolymer having a weight-average molecular weight of 284 thousand, 5 percent by weight of polyethylene glycol having a weight-average molecular weight of 20 thousand, 79 percent by weight of dimethylformamide, and 3 percent by weight of water was uniformly applied onto the surfaces of this hollow fiber membrane. The hollow fiber membrane was then immediately immersed in a mixed solvent containing 95 percent by weight of water and 5 percent by weight of dimethylformamide. The resulting hollow fiber membrane had a three-dimensional network structure on the external side and a spherical structure on the internal side. The thickness of the three-dimensional network structure was 20 μm. The hollow fiber membrane had an outer diameter of 1.44 mm and an inner diameter of 0.90 mm. The external surface of the hollow fiber membrane had pores with a mean pore size of 0.11 μm. The water permeability (conditions: differential pressure 50 kPa, 25° C.) was 0.44 $m^3/m^2 \cdot h$. The rejection was 97%. The fracture strength and the fracture elongation were 15.61 MPa and 55%, respectively. Thus, the hollow fiber membrane exhibited excellent water permeability, rejection properties, strength, and elongation.

COMPARATIVE EXAMPLE 28

A vinylidene fluoride homopolymer having a weight-average molecular weight of 358 thousand, a copolymer of ethylene tetrafluoride and vinylidene fluoride (ATOFINA Japan, Kynar (registered trade mark) 7201, weight ratio: 3:7), and cyclohexanone were mixed in amounts of 30, 10, and 60 percent by weight, respectively, and the resins were dissolved at 165° C. This polymer solution was discharged with 100% cyclohexanone, acting as a lumen forming fluid, from a double co-extrusion head with a temperature of 145° C., and was solidified in a cool bath with a temperature of 30° C. containing an aqueous solution of 90 percent by weight cyclohexanone. The product was drawn to 3.0 times in water with a temperature of 80° C. to obtain a hollow fiber membrane. The resulting hollow fiber membrane had only a spherical structure. This hollow fiber membrane had an outer diameter of 1.40 mm and an inner diameter of 0.90 mm. The external surface of the hollow fiber membrane had pores with a breadth of 1.8 μm, a length of 5.6 μm, and a mean equivalent round diameter of 3.2 μm. The water permeability (conditions: differential pressure 50 kPa, 25° C.) was 0.75 $m^3/m^2 \cdot h$. The rejection was 70%. The fracture strength and the fracture elongation were 17.15 MPa and 55%, respectively. Thus, this hollow fiber membrane exhibited inferior rejection properties.

EXAMPLE 56

A vinylidene fluoride homopolymer having a weight-average molecular weight of 417 thousand, methyl methacrylate homopolymer having a weight-average molecular weight of 280, and γ-butyrolactone were mixed in amounts of 30, 10, and 60 percent by weight, respectively, and the polymers were dissolved at a temperature of 170° C. This polymer solution was discharged with 100% γ-butyrolactone, acting as a lumen forming fluid, from a double co-extrusion head with a temperature of 110° C., and was solidified in a cool bath with a temperature of 28° C. containing an aqueous solution of 80 percent by weight γ-butyrolactone. The product was drawn to 1.5 times in water with a temperature of 80° C. to obtain a hollow fiber membrane. A mixed solution containing 13 percent by weight of vinylidene fluoride homopolymer having a weight-average molecular weight of 284 thousand, 5 percent by weight of polyethylene glycol having a weight-average molecular weight of 20 thousand, 79 percent by weight of dimethylformamide, and 3 percent by weight of water was uniformly applied onto the surfaces of this hollow fiber membrane. The hollow fiber membrane was then immediately immersed in a mixed solvent containing 95 percent by weight of water and 5 percent by weight of dimethylformamide. The resulting hollow fiber membrane had a three-dimensional network structure on the external side and a spherical structure on the internal side. The thickness of the three-dimensional network structure was 20 μm. This hollow fiber membrane had an outer diameter of 1.59 mm and an inner diameter of 0.95 mm. The external surface of the hollow fiber membrane had pores with a mean pore size of 0.04 μm. The water permeability (conditions: differential pressure 50 kPa, 25° C.) was 0.55 $m^3/m^2 \cdot h$. The rejection was 99%. The fracture strength and the fracture elongation were 6.76 MPa and 55%, respectively. Thus, the hollow fiber membrane exhibited excellent water permeability, rejection properties, strength, and elongation.

COMPARATIVE EXAMPLE 29

A vinylidene fluoride homopolymer having a weight-average molecular weight of 417 thousand, methyl methacrylate homopolymer having a weight-average molecular weight of 280, and γ-butyrolactone were mixed in amounts of 30, 10, and 60 percent by weight, respectively, and the polymers were dissolved at a temperature of 170° C. This polymer solution was discharged with 100% γ-butyrolactone, acting as a lumen forming fluid, from a double co-extrusion head with a temperature of 110° C., and was solidified in a cool bath with a temperature of 28° C. containing an aqueous solution of 80 percent by weight γ-butyrolactone. The product was drawn to 1.5 times in water with a temperature of 80° C. to obtain a hollow fiber membrane. The resulting hollow fiber membrane had only a spherical structure. This hollow fiber membrane had an outer diameter of 1.55 mm and an inner diameter of 0.95 mm. The external surface of the hollow fiber membrane had pores with a breadth of 0.96 μm, a length of 3.2 μm, and a mean equivalent round diameter of 1.75 μm. The water permeability (conditions: differential pressure 50 kPa, 25° C.) was 0.95 m$^3$/m$^2$·h. The rejection was 79%. The fracture strength and the fracture elongation were 7.33 MPa and 55%, respectively. Thus, this hollow fiber membrane exhibited inferior rejection properties.

EXAMPLES 57 to 60 and COMPARATIVE EXAMPLES 30 to 32

Hollow fiber membranes were prepared by the following method. First, hollow fiber membranes of Comparative Examples 30 to 32 were prepared under the conditions shown in Table 7. A vinylidene fluoride homopolymer having a weight-average molecular weight of 417 thousand was mixed with a solvent to be dissolved. The solution was discharged with a lumen forming fluid from a double co-extrusion head and solidified in a cool bath. Each hollow fiber membrane has only a spherical structure.

Next, A mixed solution containing 13 percent by weight of vinylidene fluoride homopolymer having a weight-average molecular weight of 284 thousand, 5 percent by weight of polyethylene glycol having a weight-average molecular weight of 20 thousand, 79 percent by weight of dimethylformamide, and 3 percent by weight of water were uniformly applied onto the surfaces of the hollow fiber membranes of Comparative Examples 30 to 32. These hollow fiber membranes were immediately immersed in a mixed solvent containing 95 percent by weight of water and 5 percent by weight of dimethylformamide to solidify the solution. These are defined as Examples 57 to 59.

A mixed solution containing 9 percent by weight of vinylidene fluoride homopolymer having a weight-average molecular weight of 284 thousand, 3.46 percent by weight of polyethylene glycol having a weight-average molecular weight of 20 thousand, 81.44 percent by weight of dimethylformamide, and 2.1 percent by weight of water was uniformly applied onto the surfaces of the hollow fiber membrane of Comparative Example 32. This hollow fiber membrane was then immediately immersed in a mixed solvent containing 95 percent by weight of water and 5 percent by weight of dimethylformamide. The resulting membrane was defined as Example 60.

These hollow fiber membranes each had a three-dimensional network structure on the external side and a spherical structure on the internal side. The thickness of the three-dimensional network structure was 20 μm. Table 8 show properties of hollow fiber membranes of Examples 57 to 40 and Comparative Examples 30 to 32. Each example exhibited higher rejection properties than those of the comparative examples.

TABLE 7

|  | Solvent | Ratio of polymer to solvent | Dissolving temp. (° C.) | Lumen forming fluid composition | Head temp. (° C.) | Cool bath composition | Cool bath temp. (° C.) | Draw ratio (Times) |
|---|---|---|---|---|---|---|---|---|
| Comparative Example 30 | Isophorone | 40:60 | 155 | 100 wt % Isophorone | 100 | 80 wt % Isophorone aq | 30 | 3.0 |
| Comparative Example 31 | Dimethyl sulfoxide | 30:70 | 95 | 90 wt % dimethyl sulfoxide aq | 95 | 90 wt % dimethyl sulfoxide aq | 8 | 1.5 |
| Comparative Example 32 | γ-butyrolactone | 38:62 | 170 | 100 wt % γ-butyrolactone | 95 | 80 wt % γ-butyrolactone aq | 28 | 1.5 |

TABLE 8

|  | Base hollow fiber membrane | Outer diameter (mm) | Inner diameter (mm) | External surface pore size (μm) | Water permeability (m$^3$/m$^2$ · h · 50 kPa) | Fracture strength (MPa) | Fracture elongation (%) | Rejection property (%) |
|---|---|---|---|---|---|---|---|---|
| Example 57 | Comparative Example 30 | 1.44 | 0.90 | 0.17 | 0.82 | 9.98 | 54 | 96 |
| Example 58 | Comparative Example 31 | 1.99 | 1.55 | 0.05 | 1.19 | 4.25 | 32 | 99 |
| Example 59 | Comparative Example 32 | 1.53 | 0.85 | 0.05 | 0.60 | 12.79 | 189 | 99 |
| Example 60 | Comparative Example 32 | 1.45 | 0.88 | 0.03 | 0.34 | 12.79 | 189 | 99 |
| Comparative Example 30 |  | 1.40 | 0.90 | 7.1 | 1.40 | 10.97 | 54 | 30 |
| Comparative Example 31 |  | 1.95 | 1.55 | 2.0 | 2.05 | 4.73 | 32 | 78 |
| Comparative Example 32 |  | 1.45 | 0.85 | 2.3 | 1.85 | 15.00 | 189 | 75 |

EXAMPLES 61 to 63

Hollow fiber membranes were prepared in the same manner as in Example 26 except that dimethylformamide was replaced with the solvents shown in Table 9. The resulting hollow fiber membranes are defined as Examples 61 to 63. Each of these hollow fiber membranes had a three-dimensional network structure on the external side and a spherical structure on the internal side. The thickness of the three-dimensional network structure was 20 μm. Table 9 show properties of hollow fiber membranes of Examples 61 to 63. Each example exhibited excellent water permeability, rejection properties, strength, and elongation.

TABLE 9

| | Solvent | Outer diameter (mm) | Inner diameter (mm) | External surface pore size (μm) | Water permeability ($m^3/m^2 \cdot h \cdot 50$ kPa) | Fracture strength (MPa) | Fracture elongation (%) | Rejection property (%) |
|---|---|---|---|---|---|---|---|---|
| Example 61 | Dimethylacetamide | 1.56 | 0.95 | 0.05 | 1.59 | 12.79 | 189 | 98 |
| Example 62 | N-methyl-2-pyrrolidone | 1.56 | 0.95 | 0.06 | 1.91 | 12.79 | 189 | 97 |
| Example 63 | Dimethyl sulfoxide | 1.56 | 0.95 | 0.07 | 2.22 | 12.79 | 189 | 96 |

EXAMPLE 64

A vinylidene fluoride homopolymer having a weight-average molecular weight of 417 thousand was mixed with γ-butyrolactone at a ratio of 38 to 62 percent by weight, respectively, and was dissolved at a temperature of 150° C. This polymer solution is referred to as A. In addition to A, 13 percent by weight of vinylidene fluoride homopolymer having a weight-average molecular weight of 284 thousand and 5 percent by weight of polyethylene glycol having a weight-average molecular weight of 20 thousand were mixed with 82 percent by weight of dimethylformamide, acting as a solvent, and were dissolved at 150° C. This polymer solution is referred to as polymer B. Polymer solutions A and B were discharged from a double co-extrusion head with a temperature of 110° C. An aqueous solution of 85 percent by weight γ-butyrolactone with a temperature of 6° C. and water with a temperature of 20° C. were respectively sprayed to polymer solutions A and B to solidify the polymers. The resulting flat membrane had a thickness of 0.175 mm. One side of the resulting flat membrane, corresponding to the B side had a three-dimensional network structure and the other side corresponding to the A side had a spherical structure. Hence, it has been shown that the three-dimensional network structure and the spherical structure coexist. The mean pore size of the three-dimensional network structure was 1.60 μm and the mean diameter of the spherical structure was 4.10 μm. The surface of the B side had pores with a mean pore size of 0.06 μm. The water permeability at 50 kPa and 25° C. was 0.25 $m^3/m^2 \cdot h$. The rejection for particles having a particle size of 0.843 μm was 98%. The fracture strength and the fracture elongation were 7.5 MPa and 40%, respectively. Thus, the flat membrane had a dense surface and exhibited excellent water permeability, rejection properties, strength, and elongation.

EXAMPLE 65

Using the same polymer solutions A and B as in Example 64, B and A were respectively discharged from the external pipe and the middle pipe of a triple co-extrusion head while an aqueous solution of 85 percent by weight γ-butyrolactone, acting as a lumen forming fluid, was discharged from the internal pipe. The discharged materials were solidified in water with a temperature of 6° C. The resulting hollow fiber membrane had an outer diameter of 1.56 mm and an inner diameter of 0.95 mm. The area around the external surface had a three-dimensional network structure and the area around the internal surface had a spherical structure. Hence, it has been shown that the three-dimensional network structure and the spherical structure coexist. The mean pore size of the three-dimensional network structure was 1.60 μm and the mean diameter of the spherical structure was 4.10 μm. The external surface had pores with a mean pore size of 0.04 μm. The water permeability at 50 kPa and 25° C. was 1.27 $m^3/m^2 \cdot h$. The rejection for particles having a particle size of 0.843 μm was 99%. The fracture strength and the fracture elongation were 12.79 MPa and 189%, respectively. Thus, the hollow fiber membrane had a dense surface and exhibited excellent water permeability, rejection properties, strength, and elongation.

The porous membrane of the present invention has a high strength and excellent water permeability and rejection properties. According to the method for manufacturing the porous membrane of the present invention, a porous membrane can be manufactured through reduced number of steps at a low cost, using a highly chemical-resistant thermoplastic resin. The resulting porous membrane can exhibit a high strength and excellent water permeability and rejection properties. The porous membrane of the present invention is suitably used for water treatment, battery separators, charged membranes, fuel cells, and blood purification membranes.

What is claimed is:

1. A porous membrane formed of a thermoplastic resin, comprising one surface side comprising a three-dimensional network structure and another surface side comprising a spherical structure, wherein the spherical structure is a structure in which many spherical or substantially spherical solid contents of the thermoplastic resin are combined to each other directly or through streak solid contents, the porous membrane having a water permeability in the range of 0.1 to 10 m3/m2·h at 50 kPa and 25° C., a rejection of 90% or more for particles with a mean particle size of 0.843 gm, a fracture strength of 2 MPa or more, and a fracture elongation of 15% or more.

2. The porous thermoplastic resin membrane of claim 1, wherein the mean pore size of the three-dimensional network structure is in the range of 5 nm to 50 μm.

3. The porous thermoplastic resin membrane of claim 1, wherein the mean diameter of the spherical structure is in the range of 0.1 μm to 10 μm.

4. The porous thermoplastic resin membrane of claim 1, wherein at least one surface thereof has a mean pore size of 0.5 μm or less.

5. The porous thermoplastic resin membrane of claim 1, wherein the thermoplastic resin is selected from the group consisting of polyethylene resins, polypropylene resins, and polyvinylidene fluoride resins and mixtures thereof.

6. A battery separator comprising the porous thermoplastic resin membrane of claim 1.

7. A charged membrane comprising the porous thermoplastic resin membrane of claim 1.

8. A fuel cell comprising the porous thermoplastic resin membrane of claim 1.

9. A blood purification membrane comprising the porous thermoplastic resin membrane of claim 1.

10. The porous membrane module comprising the porous thermoplastic resin membrane of claim 1.

11. A water separation apparatus comprising: a porous membrane module as set forth in claim 10; and compression means at a raw water side of the porous membrane module or suction means at a permeate side of the porous membrane module.

12. A method for producing permeate from raw water, comprising passing the raw water through the porous membrane module of claim 10 under suction or compression from a permeate side of the porous membrane module.

* * * * *